US012674277B2

(12) United States Patent
Yamada

(10) Patent No.: US 12,674,277 B2
(45) Date of Patent: Jul. 7, 2026

(54) INK JET TEXTILE PRINTING RECORDING METHOD

(71) Applicant: SEIKO EPSON CORPORATION, Tokyo (JP)

(72) Inventor: Akiko Yamada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 207 days.

(21) Appl. No.: 18/586,627

(22) Filed: Feb. 26, 2024

(65) Prior Publication Data

US 2024/0287736 A1 Aug. 29, 2024

(30) Foreign Application Priority Data

Feb. 27, 2023 (JP) ................................. 2023-028607

(51) Int. Cl.
*D06P 5/30* (2006.01)
*B41J 2/01* (2006.01)
(Continued)

(52) U.S. Cl.
CPC . *D06P 5/30* (2013.01); *B41J 2/01* (2013.01); *B41J 2/2114* (2013.01); *B41M 3/008* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

2007/0076069 A1* 4/2007 Edwards .............. B41M 5/0023
347/100
2009/0153613 A1* 6/2009 Yamanobe ........... B41M 5/0017
347/21
(Continued)

FOREIGN PATENT DOCUMENTS

JP 2016-089288 A 5/2016

*Primary Examiner* — Manish S Shah
(74) *Attorney, Agent, or Firm* — Harness, Dickey & Pierce, P.L.C.

(57) ABSTRACT

An ink jet textile printing recording method including a colored ink attachment step of attaching a liquid droplet of a colored ink composition containing a pigment and an anionic first resin particle to a fabric, a treatment liquid attachment step of attaching a liquid droplet of a treatment liquid containing a polyvalent metal salt to the fabric, and a non-colored ink attachment step of attaching a liquid droplet of a non-colored ink composition containing an anionic second resin particle to the fabric, the colored ink attachment step, in which the treatment liquid attachment step, and the non-colored ink attachment step are performed by an ink jet method, in the ink jet method, main scanning is performed for recording by moving an ink jet head in a direction perpendicular to a transport direction of the fabric, the colored ink composition, the treatment liquid, and the non-colored ink composition are attached to the same scanning region of the fabric by the same main scanning, an attachment amount of the polyvalent metal salt to the fabric is 0.3 (mg/inch$^2$) or more, a content of the second resin particle with respect to a total amount of the non-colored ink composition is higher than a content of the first resin particle with respect to a total amount of the colored ink composition, and an attachment amount of the non-colored ink composition is smaller than an attachment amount of the colored ink composition.

15 Claims, 7 Drawing Sheets

(51) Int. Cl.

| | |
|---|---|
| *B41J 2/21* | (2006.01) |
| *B41M 3/00* | (2006.01) |
| *B41M 5/00* | (2006.01) |
| *C09D 11/102* | (2014.01) |
| *C09D 11/322* | (2014.01) |
| *C09D 11/38* | (2014.01) |
| *C09D 11/54* | (2014.01) |
| *D06P 1/52* | (2006.01) |
| *D06P 1/673* | (2006.01) |
| *D06P 5/00* | (2006.01) |

(52) U.S. Cl.
CPC ......... *B41M 5/0017* (2013.01); *C09D 11/102* (2013.01); *C09D 11/322* (2013.01); *C09D 11/38* (2013.01); *C09D 11/54* (2013.01); *D06P 1/5285* (2013.01); *D06P 1/67375* (2013.01); *D06P 5/002* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108

See application file for complete search history.

(56) References Cited

U.S. PATENT DOCUMENTS

| | | | | |
|---|---|---|---|---|
| 2013/0278660 | A1* | 10/2013 | Tsuji | B41J 2/2132 |
| | | | | 347/14 |
| 2017/0107391 | A1 | 4/2017 | Okuda | |
| 2019/0283464 | A1* | 9/2019 | Matsuzaki | C09D 11/38 |
| 2020/0094583 | A1 | 3/2020 | Asakawa et al. | |
| 2020/0165474 | A1* | 5/2020 | Nakamura | C08L 69/00 |
| 2021/0301167 | A1* | 9/2021 | Okada | C09D 11/102 |
| 2022/0154396 | A1* | 5/2022 | Oriakhi | D06P 5/30 |
| 2023/0347675 | A1* | 11/2023 | Yamada | D06P 5/30 |
| 2024/0401268 | A1* | 12/2024 | Miyasa | D06P 1/5257 |
| 2025/0121611 | A1* | 4/2025 | Aoki | B41J 2/155 |

* cited by examiner

TABLE 1: COMPOSITION OF
TREATMENT LIQUID (% BY MASS)

| | TREATMENT LIQUID 1 | TREATMENT LIQUID 2 | TREATMENT LIQUID 3 | TREATMENT LIQUID 4 |
|---|---|---|---|---|
| MAGNESIUM SULFATE HEPTAHYDRATE | 5.0 | 1.0 | 10.0 | — |
| CALCIUM CHLORIDE DIHYDRATE | — | — | — | 5.0 |
| GLYCERIN | 20.0 | 20.0 | 18.0 | 20.0 |
| SURFACTANT | 1.0 | 1.0 | 1.0 | 1.0 |
| PROXEL XL2 | 0.2 | 0.2 | 0.2 | 0.2 |
| PURE WATER | BALANCE | BALANCE | BALANCE | BALANCE |

FIG. 4

TABLE 2: COMPOSITION OF INK (% BY MASS)

| | INK 1 | INK 2 | INK 3 | INK 4 |
|---|---|---|---|---|
| UW-1527F | 4.0 | 10.0 | 3.5 | — |
| MOWINYL 6760 | — | — | — | 4.0 |
| PB15:3 | 3.5 | 3.5 | 3.5 | 3.5 |
| GLYCERIN | 12.8 | 8.0 | 13.0 | 12.8 |
| TEG | 4.5 | 3.0 | 4.5 | 4.5 |
| BTG | 0.7 | 0.7 | 0.7 | 0.7 |
| E1010 | 0.5 | 0.5 | 0.5 | 0.5 |
| TEA | 1.0 | 1.0 | 1.0 | 1.0 |
| WATER | BALANCE | BALANCE | BALANCE | BALANCE |

FIG. 5

TABLE 3: COMPOSITION
OF CLEAR INK (% BY MASS)

| | CLEAR INK 1 | CLEAR INK 2 | CLEAR INK 3 | CLEAR INK 4 | CLEAR INK 5 | CLEAR INK 6 |
|---|---|---|---|---|---|---|
| UW-1527F | 10.0 | 3.0 | 10.0 | 10.0 | 10.0 | 4.0 |
| GLYCERIN (BOILING POINT: 290°C) | 20.0 | 22.0 | 10.0 | 5.0 | — | 22.0 |
| PROPYLENE GLYCOL (BOILING POINT: 188°C) | — | — | — | — | 20.0 | — |
| TEG (BOILING POINT: 287°C) | 4.5 | 4.5 | 4.5 | 4.5 | 4.5 | 4.5 |
| BTG (BOILING POINT: 278°C) | 0.7 | 0.7 | 0.7 | 0.7 | 0.7 | 0.7 |
| E1010 | 0.5 | 0.5 | 0.5 | 0.5 | 0.5 | 0.5 |
| WATER | BALANCE | BALANCE | BALANCE | BALANCE | BALANCE | BALANCE |

FIG. 6

TABLE 4:

| | | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|---|
| COMPOSITION | TREATMENT LIQUID | TREATMENT LIQUID 1 | TREATMENT LIQUID 4 | TREATMENT LIQUID 1 | TREATMENT LIQUID 1 | TREATMENT LIQUID 1 | TREATMENT LIQUID 1 | TREATMENT LIQUID 1 | TREATMENT LIQUID 1 |
| | INK | INK 1 | INK 1 | INK 1 | INK 1 | INK 1 | INK 1 | INK 1 | INK 1 |
| | CLEAR INK | CLEAR INK 1 | CLEAR INK 1 | CLEAR INK 1 | CLEAR INK 1 | CLEAR INK 1 | CLEAR INK 1 | CLEAR INK 1 | CLEAR INK 1 |
| AMOUNT OF RESIN | AMOUNT OF INK RESIN | 4% | 4% | 4% | 4% | 4% | 4% | 4% | 4% |
| | AMOUNT OF CLEAR INK RESIN | 10% | 10% | 10% | 10% | 10% | 10% | 10% | 10% |
| ATTACHMENT AMOUNT mg/inch² | TREATMENT LIQUID | 17.3 | 17.3 | 17.3 | 17.3 | 17.3 | 17.3 | 17.3 | 6.9 |
| | POLYVALENT METAL SALT (IN TREATMENT LIQUID) | 0.9 | 0.9 | 0.9 | 0.9 | 0.9 | 0.9 | 0.9 | 0.3 |
| | INK | 17.3 | 17.3 | 34.6 | 41.5 | 17.3 | 34.6 | 38.0 | 17.3 |
| | CLEAR INK | 13.8 | 13.8 | 15.6 | 15.6 | 13.8 | 12.1 | 10.4 | 13.8 |
| | TOTAL ATTACHMENT AMOUNT | 48.4 | 48.4 | 67.4 | 74.3 | 48.4 | 63.9 | 65.7 | 38.0 |
| | TOTAL ATTACHMENT AMOUNT IN 1 PASS | 12.1 | 12.1 | 16.8 | 18.6 | 48.4 | 16.0 | 16.4 | 9.5 |
| EVALUATION | STRIKE-THROUGH | A | A | A | B | B | A | A | A |
| | COLOR DEVELOPMENT | A | A | A | A | B | A | A | B |
| | RUBBING FASTNESS | A | B | A | A | B | A | B | B |
| | INTERMITTENCE (CLEAR INK) | A | — | — | — | — | — | — | — |
| RATIO | PIGMENT/RESIN RATIO (A/(B+C)) | 0.29 | 0.29 | 0.41 | 0.45 | 0.29 | 0.47 | 0.52 | 0.29 |
| | POLYVALENT METAL SALT/ AGGREGATED COMPONENT RATIO (D/(A+B+C)) | 0.32 | 0.32 | 0.21 | 0.19 | 0.32 | 0.23 | 0.22 | 0.13 |
| NUMBER OF PASSES | NUMBER OF PASSES | 4 pass | 4 pass | 4 pass | 4 pass | 1 pass | 4 pass | 4 pass | 4 pass |

FIG. 7

TABLE 5:

| | | EXAMPLE 9 | EXAMPLE 10 | EXAMPLE 11 | EXAMPLE 12 | EXAMPLE 13 | EXAMPLE 14 | EXAMPLE 15 | EXAMPLE 16 |
|---|---|---|---|---|---|---|---|---|---|
| COMPOSITION | TREATMENT LIQUID | TREATMENT LIQUID 1 | TREATMENT LIQUID 1 | TREATMENT LIQUID 1 | TREATMENT LIQUID 1 | TREATMENT LIQUID 1 | TREATMENT LIQUID 3 | TREATMENT LIQUID 1 | TREATMENT LIQUID 1 |
| | INK | INK 1 | INK 1 | INK 1 | INK 1 | INK 1 | INK 1 | INK 3 | INK 4 |
| | CLEAR INK | CLEAR INK 1 | CLEAR INK 3 | CLEAR INK 4 | CLEAR INK 5 | CLEAR INK 1 | CLEAR INK 1 | CLEAR INK 6 | CLEAR INK 1 |
| AMOUNT OF RESIN | AMOUNT OF INK RESIN | 4% | 4% | 4% | 4% | 4% | 4% | 4% | 4% |
| | AMOUNT OF CLEAR INK RESIN | 10% | 10% | 10% | 10% | 10% | 10% | 4% | 10% |
| ATTACHMENT AMOUNT mg/inch² | TREATMENT LIQUID | 6.9 | 17.3 | 17.3 | 17.3 | 17.3 | 17.3 | 17.3 | 17.3 |
| | POLYVALENT METAL SALT (IN TREATMENT LIQUID) | 0.3 | 0.9 | 0.9 | 0.9 | 0.9 | 1.7 | 0.9 | 0.9 |
| | INK | 27.6 | 17.3 | 17.3 | 17.3 | 13.8 | 17.3 | 17.3 | 17.3 |
| | CLEAR INK | 17.3 | 13.8 | 13.8 | 13.8 | 12.1 | 13.8 | 13.8 | 13.8 |
| | TOTAL ATTACHMENT AMOUNT | 51.8 | 48.4 | 48.4 | 48.4 | 43.2 | 48.4 | 48.4 | 48.4 |
| | TOTAL ATTACHMENT AMOUNT IN 1 PASS | 13.0 | 12.1 | 12.1 | 12.1 | 10.8 | 12.1 | 12.1 | 12.1 |
| EVALUATION | STRIKE-THROUGH | B | B | B | B | A | A | A | A |
| | COLOR DEVELOPMENT | A | B | B | B | B | B | B | A |
| | RUBBING FASTNESS | B | B | B | B | A | A | B | B |
| | INTERMITTENCE (CLEAR INK) | — | B | C | C | — | — | — | — |
| RATIO | PIGMENT/RESIN RATIO (A/(B+C)) | 0.34 | 0.29 | 0.29 | 0.29 | 0.27 | 0.29 | 0.49 | 0.29 |
| | POLYVALENT METAL SALT/ AGGREGATED COMPONENT RATIO (D/(A+B+C)) | 0.09 | 0.32 | 0.32 | 0.32 | 0.38 | 0.65 | 0.47 | 0.32 |
| NUMBER OF PASSES | NUMBER OF PASSES | 4 pass | 4 pass | 4 pass | 4 pass | 4 pass | 4 pass | 4 pass | 4 pass |

FIG. 8

TABLE 6:

| | | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 |
|---|---|---|---|---|---|---|---|
| COMPOSITION | TREATMENT LIQUID | TREATMENT LIQUID 1 | TREATMENT LIQUID 2 | TREATMENT LIQUID 1 | TREATMENT LIQUID 1 | TREATMENT LIQUID 1 | TREATMENT LIQUID 1 |
| | INK | INK 1 | INK 1 | INK 1 | INK 1 | INK 1 | INK 2 |
| | CLEAR INK | — | CLEAR INK 1 | CLEAR INK 1 | CLEAR INK 2 | CLEAR INK 2 | CLEAR INK 6 |
| AMOUNT OF RESIN | AMOUNT OF INK RESIN | 4% | 4% | 4% | 4% | 4% | 10% |
| | AMOUNT OF CLEAR INK RESIN | — | 10% | 10% | 3% | 3% | 4% |
| ATTACHMENT AMOUNT mg/inch² | TREATMENT LIQUID | 17.3 | 17.3 | 6.9 | 17.3 | 17.3 | 17.3 |
| | POLYVALENT METAL SALT (IN TREATMENT LIQUID) | 0.9 | 0.2 | 0.3 | 0.9 | 0.9 | 0.9 |
| | INK | 17.3 | 17.3 | 17.3 | 17.3 | 27.6 | 13.8 |
| | CLEAR INK | — | 13.8 | 27.6 | 13.8 | 25.9 | 17.3 |
| | TOTAL ATTACHMENT AMOUNT | 34.6 | 48.4 | 51.8 | 48.4 | 70.8 | 48.4 |
| | TOTAL ATTACHMENT AMOUNT IN 1 PASS | 8.6 | 12.1 | 13.0 | 12.1 | 17.7 | 12.1 |
| EVALUATION | STRIKE-THROUGH | A | C | C | A | B | A |
| | COLOR DEVELOPMENT | C | B | B | B | A | C |
| | RUBBING FASTNESS | C | B | B | C | C | A |
| | INTERMITTENCE (CLEAR INK) | — | — | — | — | — | — |
| RATIO | PIGMENT/RESIN RATIO (A/(B+C)) | 0.88 | 0.29 | 0.18 | 0.55 | 0.51 | 0.23 |
| | POLYVALENT METAL SALT/ AGGREGATED COMPONENT RATIO (D/(A+B+C)) | 0.67 | 0.06 | 0.09 | 0.51 | 0.30 | 0.34 |
| NUMBER OF PASSES | NUMBER OF PASSES | 4 pass | 4 pass | 4 pass | 4 pass | 4 pass | 4 pass |

INK JET TEXTILE PRINTING RECORDING METHOD

The present application is based on, and claims priority from JP Application Serial Number 2023-028607, filed Feb. 27, 2023, the disclosure of which is hereby incorporated by reference herein in its entirety.

BACKGROUND

1. Technical Field

The present disclosure relates to an ink jet textile printing recording method.

2. Related Art

Attempts are made to apply an ink jet method to not only recording of images on paper and the like, but also textile printing on fabrics, and various ink jet textile printing methods are investigated. An ink jet ink for textile printing contains a coloring material in order to obtain an image having a desired color, and as the coloring material, dyes and pigments are used. In addition, in ink jet textile printing, many investigations are conducted on inks and recording methods.

For example, in ink jet textile printing, pretreatment of fabrics and coating of images are investigated in order to enhance the color developing properties and fastness of images. For example, JP-A-2016-089288 discloses that a treatment with a pretreatment liquid is attempted in pigment textile printing, and ink is attached without drying the pretreatment liquid.

However, the application of a pretreatment liquid and a coating liquid is often performed by separate apparatuses, and large equipment or a complicated process is required. On the other hand, when an attempt is made to perform continuous attachment of the pretreatment liquid and the coating liquid in the same apparatus, image strike-through, deterioration in color developing properties, deterioration in rubbing fastness, and the like may occur in some cases.

SUMMARY

According to an aspect of the present disclosure, there is provided an ink jet textile printing recording method including a colored ink attachment step of attaching a liquid droplet of a colored ink composition containing a pigment and an anionic first resin particle to a fabric, a treatment liquid attachment step of attaching a liquid droplet of a treatment liquid containing a polyvalent metal salt to the fabric, and a non-colored ink attachment step of attaching a liquid droplet of a non-colored ink composition containing an anionic second resin particle to the fabric, in which the colored ink attachment step, the treatment liquid attachment step, and the non-colored ink attachment step are performed by an ink jet method, in the ink jet method, main scanning is performed for recording by moving an ink jet head in a direction perpendicular to a transport direction of the fabric, the colored ink composition, the treatment liquid, and the non-colored ink composition are attached to the same scanning region of the fabric by the same main scanning, an attachment amount of the polyvalent metal salt to the fabric is 0.3 (mg/inch$^2$) or more, a content of the second resin particle with respect to a total amount of the non-colored ink composition is higher than a content of the first resin particle with respect to a total amount of the colored ink composition, and an attachment amount of the non-colored ink composition is smaller than an attachment amount of the colored ink composition.

BRIEF DESCRIPTION OF THE DRAWINGS

FIG. 3 is a table (Table 1) showing compositions of treatment liquids used in Examples and Comparative Examples.

FIG. 4 is a table (Table 2) showing compositions of inks used in Examples and Comparative Examples.

FIG. 5 is a table (Table 3) showing compositions of clear inks used in Examples and Comparative Examples.

FIG. 6 is a table (Table 4) showing conditions and evaluation results of Examples.

FIG. 7 is a table (Table 5) showing conditions and evaluation results of Examples.

FIG. 8 is a table (Table 6) showing conditions and evaluation results of Comparative Examples.

DESCRIPTION OF EMBODIMENTS

Figures 1, 2:
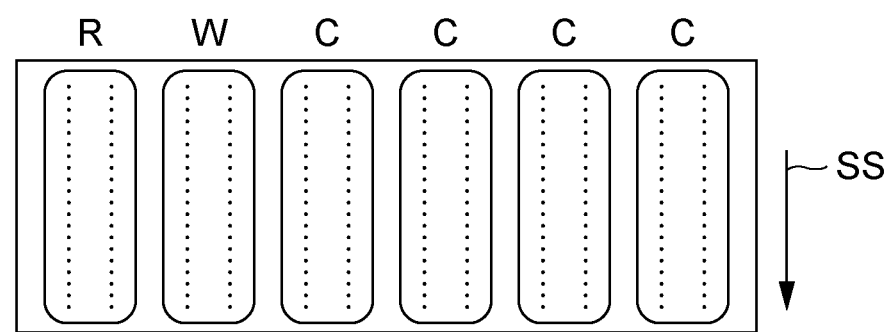
FIG. 1 is a schematic view of an ink jet textile printing apparatus configured to be applicable to a textile printing recording method according to the present embodiment.
FIG. 2 is a schematic view of an example of an ink jet head of an ink jet recording apparatus that can be used in the recording method of the embodiment.

Hereinafter, embodiments of the present disclosure will be described. The embodiments described below describe examples of the present disclosure. The present disclosure is not limited to the following embodiments, and includes various modifications implemented within a range not changing a gist of the present disclosure. It should be noted that not all of the configurations described below are essential configurations of the present disclosure.

1. INK JET TEXTILE PRINTING RECORDING METHOD

An ink jet textile printing recording method according to the present embodiment includes a colored ink attachment step of attaching a liquid droplet of a colored ink composition to a fabric, a treatment liquid attachment step of attaching a liquid droplet of a treatment liquid to the fabric, and a non-colored ink attachment step of attaching a liquid droplet of a non-colored ink composition to the fabric.

1.1. Colored Ink Attachment Step

The colored ink attachment step is a step of attaching a colored ink composition to a fabric. Hereinafter, the colored ink composition will be described. The method of attachment to the fabric will be described later.

The colored ink composition may be an aqueous ink. The aqueous ink may contain, for example, a solvent component that can evaporate, in addition to water. Further, the aqueous ink may be an aqueous resin ink containing a resin. With such an ink, recording is performed by drying and evaporating the solvent component from the ink attached to the fabric and leaving a component such as a coloring material on the fabric.

1.1.1. Colored Ink Composition

The colored ink composition contains at least a pigment and anionic first resin particles.

1.1.1. (1) Pigment

The colored ink composition is a so-called color ink which contains a pigment. Examples of the pigment contained in the colored ink composition include color pigments such as cyan, yellow, magenta, black, red, green, and orange pigments, and special color pigments such as a white pigment.

The pigment may be a mixture. The pigment is excellent in storage stability such as light resistance, weather resistance, and gas resistance, and is preferably an organic pigment from that viewpoint.

Specifically, as the pigment, azo pigments such as insoluble azo pigments, condensed azo pigments, azo lakes, and chelated azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelates, dye lakes, nitro pigments, nitroso pigments, aniline black, daylight fluorescent pigments, carbon black, and the like can be used. These pigments may be used alone or in combination of two or more types thereof. Further, a white pigment, a photoluminescent pigment, or the like may be used as the pigment.

Specific examples of the pigments are not particularly limited, but examples thereof include the following.

Examples of black pigments include No. 2300, No. 900, MCF 88, No. 33, No. 40, No. 45, No. 52, MA7, MA8, MA100, and No. 2200 B (all manufactured by Mitsubishi Chemical Corporation), Raven 5750, Raven 5250, Raven 5000, Raven 3500, Raven 1255, and Raven 700 (all manufactured by Columbia Carbon Inc.), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (manufactured by CABOT JAPAN K.K.), Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (all manufactured by Degussa).

Examples of yellow pigments include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of magenta pigments include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, or C.I. Pigment Violet 19, 23, 32, 33, 36, 38, 43, and 50.

Examples of cyan pigments include C. I. Pigment Blue 1, 2, 3, 15, 15: 1, 15: 2, 15: 3, 15: 34, 15: 4, 16, 18, 22, 25, 60, 65, and 66, and C. I. Bat blue 4 and 60.

In addition, pigments other than the magenta, cyan, and yellow pigments are not particularly limited and examples thereof include C.I. Pigment Green 7, 10, C.I. Pigment Brown 3, 5, 25, 26, and C.I. Pigment Orange 1, 2, 5, 7, 13, 14, 15, 16, 24, 34, 36, 38, 40, 43, and 63.

Examples of the white pigment include metal compounds such as metal oxide, barium sulfate, and calcium carbonate. Examples of the metal oxide include titanium dioxide, zinc oxide, silica, alumina, magnesium oxide, and the like. In addition, particles having a hollow structure may be used as the white pigment, and as the particles having a hollow structure, known particles can be used.

Suitably, the pigment can be stably dispersed in a dispersion medium, and for this purpose, a dispersant may be used to disperse the pigment. As the dispersant, there is provided a resin dispersant and the like, and the dispersant is selected from those that can improve dispersion stability of the pigment in the colored ink composition. In addition, the pigment may also be used as a self-dispersible pigment by, for example, oxidizing or sulfonating the surface of the pigment with ozone, hypochlorous acid, fuming sulfuric acid, or the like to modify the surface of the pigment particle.

Examples of the resin dispersant (dispersant resin) include (meth)acrylic resins such as poly(meth)acrylic acid, (meth)acrylic acid-acrylonitrile copolymers, (meth)acrylic acid-(meth)acrylic acid ester copolymers, vinyl acetate-(meth)acrylic acid ester copolymers, vinyl acetate-(meth)acrylic acid copolymers, and vinyl naphthalene-(meth)acrylic acid copolymers, and salts thereof; styrene resins such as styrene-(meth)acrylic acid copolymers, styrene-(meth)acrylic acid-(meth)acrylic acid ester copolymers, styrene-α-methylstyrene-(meth)acrylic acid copolymers, styrene-α-methylstyrene-(meth)acrylic acid-(meth)acrylic acid ester copolymers, styrene-maleic acid copolymers, and styrene-maleic acid anhydride copolymers, and salts thereof; urethane resins, which are polymer compounds (resins) having a urethane bond formed when an isocyanate group reacts with a hydroxyl group, and which may be linear and/or branched regardless of a crosslinked structure, and salts thereof; polyvinyl alcohols; vinyl naphthalene-maleic acid copolymers and salts thereof; vinyl acetate-maleic acid ester copolymers and salts thereof; and water-soluble resins such as vinyl acetate-crotonic acid copolymers and salts thereof. Among these, a copolymer of a monomer having a hydrophobic functional group and a monomer having a hydrophilic functional group, and a polymer formed of monomers having both a hydrophobic functional group and a hydrophilic functional group are preferable. As the form of the copolymer, any form of a random copolymer, a block copolymer, an alternating copolymer, and a graft copolymer can be used.

Examples of commercially available products of the styrene resin dispersant include X-200, X-1, X-205, X-220, and X-228 (manufactured by SEIKO PMC CORPORATION), NOPCOSPERSE (registered trademark) 6100 and 6110 (manufactured by SAN NOPCO LIMITED), JONCRYL 67, 586, 611, 678, 680, 682, and 819 (manufactured by BASF SE), DISPER BYK-190 (manufactured by BYK Japan KK.), and N-EA137, N-EA157, N-EA167, N-EA177, N-EA197D, N-EA207D, and E-EN10 (manufactured by DKS Co., Ltd.).

In addition, examples of commercially available products of the acrylic resin dispersants include BYK-187, BYK-190, BYK-191, BYK-194N, and BYK-199 (manufactured by BYK Japan KK.), and Aron A-210, A6114, AS-1100, AS-1800, A-30SL, A-7250, and CL-2 (manufactured by TOAGOSEI CO., LTD.).

Further, examples of commercially available products of the urethane resin dispersant include BYK-182, BYK-183, BYK-184, and BYK-185 (manufactured by BYK Japan KK.), TEGO Dispers 710 (manufactured by Evonik Tego Chemi GmbH), and Borchi (registered trademark) Gen 1350 (manufactured by OMG Borchers GmbH).

These dispersants may be used alone or in combination of two or more types thereof. The total content of the dispersant is preferably 0.1 parts by mass or more and 30 parts by mass or less, more preferably 0.5 parts by mass or more and 25 parts by mass or less, even more preferably 1 part by mass or more and 20 parts by mass or less, and still even more preferably 1.5 parts by mass or more and 15 parts by mass or less, with respect to 50 parts by mass of the pigment. When the content of the dispersant is 0.1 parts by mass or more with respect to 50 parts by mass of the pigment, the dispersion stability of the pigment can be further enhanced. In addition, when the content of the dispersant is 30 parts by mass or less with respect to 50 parts by mass of the pigment, the viscosity of the obtained dispersion can be suppressed to be small.

Among the dispersants exemplified above, it is more preferable that the dispersant is at least one selected from anionic dispersant resins. In addition, in this case, it is more preferable that a weight average molecular weight of the dispersant is 500 or more. Further, the weight average molecular weight is preferably 5,000 or more and 100,000 or less, and more preferably 10,000 or more and 50,000 or less.

By using such a resin dispersant as the dispersant, the dispersion and aggregation of the pigment are further improved, and an image having more favorable dispersion stability and more favorable image quality can be obtained.

The anionic dispersant resin is a resin in which the resin has an anionic functional group and exhibits anionic properties. Examples of the anionic functional group include a carboxyl group, a sulfo group, and a phosphoric acid group. Among these groups, a carboxyl group is more preferable.

The dispersant resin preferably has an acid value, and the acid value is preferably 5 mg KOH/g or more, more preferably 10 to 200 mg KOH/g, and even more preferably 15 to 150 mg KOH/g. Further, an acid value of 20 to 100 mg KOH/g is preferable, and an acid value of 25 to 70 mg KOH/g is more preferable.

The acid value can be measured by the neutralization titration method in accordance with JIS K 0070. As a titration device, for example, "AT610" manufactured by Kyoto Electronics Manufacturing Co., Ltd. can be used.

The content of the pigment is preferably 0.3% by mass or more and 20% by mass or less, and more preferably 0.5% by mass or more and 15% by mass or less with respect to the total mass of the colored ink composition. Further, the content is preferably 1% by mass or more and 10% by mass or less, and more preferably 2% by mass or more and 7% by mass or less.

In addition, the volume average particle diameter of the pigment particles is preferably 10 nm or more and 300 nm or less, more preferably 30 nm or more and 250 nm or less, even more preferably 50 nm or more and 250 nm or less, and particularly preferably 70 nm or more and 200 nm or less. Further, the volume average particle diameter is preferably 80 nm or more and 150 nm or less.

1.1.1. (2) First Resin Particles

The colored ink composition contains anionic resin particles. In this specification, the resin particles included in the colored ink composition are referred to as first resin particles. The colored ink composition may be a colored aqueous resin ink. The resin particles can further improve the adhesion of an image due to the colored ink composition attached to the fabric. As the anionic resin particles, for example, there may be mentioned resin particles having anionic properties among resin particles formed of a urethane resin, an acrylic resin (including styrene-acrylic resin), a fluorene resin, a polyolefin resin, a rosin-modified resin, a terpene resin, a polyester resin, a polyamide resin, an epoxy resin, a vinyl chloride resin, a vinyl chloride-vinyl acetate copolymer, an ethylene vinyl acetate resin, and the like.

Among these, a urethane resin, an acrylic resin, a polyolefin resin, and a polyester resin are preferable. These resin particles are often handled in the form of an emulsion, but may be in the form of powder. In addition, the resin particles can be used alone or in combination of two or more types thereof.

Among these, the resin particle is more preferably a urethane resin. When urethane resin is selected, an image having more favorable rubbing fastness can be formed.

Urethane resin is a generic term for resins having a urethane bond. For the urethane resin, a polyether-type urethane resin including an ether bond in the main chain, a polyester-type urethane resin including an ester bond in the main chain, a polycarbonate-type urethane resin including a carbonate bond in the main chain, and the like, in addition to a urethane bond, may be used. In addition, as the urethane resin, a commercially available product may be used, and for example, commercially available products such as SUPER-FLEX 460, 460s, 840, and E-4000 (trade names, manufactured by DKS Co., Ltd.), RESAMINE D-1060, D-2020, D-4080, D-4200, D-6300, and D-6455 (trade names, manufactured by Dainichiseika Color & Chemicals Mfg. Co., Ltd.), Takelac WS-6021, and W-512-A-6 (trade names, manufactured by Mitsui Chemicals & SKC Polyurethanes Inc.), Sancure 2710 (trade name, manufactured by Lubrizol Corporation), PERMARIN UA-150 (trade name, manufactured by Sanyo Chemical Industries Ltd.), ETERNACOLL UW series, for example, UW-1527 or the like, (manufactured by UBE Corporation), and the like may be used.

Acrylic resin is a generic term for polymers obtained by polymerizing at least acrylic monomers such as (meth) acrylic acid and (meth)acrylic acid ester as one component, and examples thereof include a resin obtained from an acrylic monomer and a copolymer of an acrylic monomer and other monomers. Examples thereof include an acrylic-vinyl resin which is a copolymer of an acrylic monomer and a vinyl monomer. In addition, examples of the vinyl monomer include styrene.

As the acrylic monomer, acrylamide, acrylonitrile, and the like can also be used. For the resin emulsion using acrylic resin as a raw material, a commercially available product may be used, and for example, any resin emulsion may be selected and used from FK-854 (trade name, manufactured by CHIRIKA Co., Ltd.), Mowinyl 952B, 718A, and 6760 (trade names, manufactured by Japan Coating Resin Corporation), Nipol LX852 and LX874 (trade names, manufactured by Zeon Corporation), and the like.

Incidentally, in the present specification, the acrylic resin may be a styrene-acrylic resin described below. In addition, in the present specification, the notation of "(meth)acrylic" means at least one of acrylic and methacrylic.

The styrene-acrylic resin is a copolymer obtained from a styrene monomer and a (meth)acrylic monomer, and examples thereof include styrene-acrylic acid copolymers, styrene-methacrylic acid copolymers, styrene-methacrylic acid-acrylate copolymers, styrene-α-methylstyrene-acrylic acid copolymers, and styrene-α-methylstyrene-acrylic acid-acrylate copolymers. As the styrene acrylic resin, a commercially available product may be used, and for example, Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade names, manufactured by BASF SE), Mowinyl 966A and 975N (trade names, manufactured by Japan Coating Resin Corporation), VINYBLAN 2586 (manufactured by Nissin Chemical Industry Co., Ltd.), and the like may be used.

The polyolefin resin has an olefin such as ethylene, propylene, or butylene in the structural skeleton, and known ones can be appropriately selected and used. As the olefin resin, a commercially available product can be used, for example, ARROWBASE CB-1200, CD-1200 (trade name, manufactured by Unitika Ltd.), and the like may be used.

In addition, the resin particles may be supplied in the form of an emulsion, and as examples of commercially available products of such a resin emulsion include Microgel E-1002 and E-5002 (trade names, manufactured by Nippon Paint Co. Ltd., styrene-acrylic resin emulsion), VONCOAT 4001 (trade name, manufactured by DIC Corporation, acrylic resin emulsion), VONCOAT 5454 (trade name, manufactured by DIC Corporation, styrene-acrylic resin emulsion), Polysol AM-710, AM-920, AM-2300, AP-4735, AT-860, and PSASE-4210E (acrylic resin emulsion), Polysol AP-7020 (styrene acrylic resin emulsion), Polysol SH-502 (vinyl acetate resin emulsion), Polysol AD-13, AD-2, AD-10, AD-96, AD-17, and AD-70 (ethylene vinyl acetate resin emulsion), Polysol PSASE-6010 (ethylene vinyl acetate resin emulsion) (trade names, manufactured by Showa Denko KK), Polysol SAE1014 (trade name, styrene-acrylic resin emulsion, manufactured by Zeon Corporation), Saivinol SK-200 (trade name, acrylic resin emulsion, manufactured by Saiden Chemical Industry Co., Ltd.), AE-120A (trade name, manufactured by JSR Corporation, acrylic resin emulsion), AE373D (trade name, manufactured by Emulsion Technology Co., Ltd., carboxy-modified styrene acrylic resin emulsion), Seikadyne 1900W (trade name, manufactured by Dainichiseika Color & Chemicals Mfg. Co., Ltd., ethylene vinyl acetate resin emulsion), VINYBLAN 2682 (acrylic resin emulsion), VINYBLAN 2886 (vinyl acetate acrylic resin emulsion), VINYBLAN 5202 (acetic acid acrylic resin emulsion) (trade names, manufactured by Nisshin Chemical Industry Co., Ltd.), Elitel KA-5071S, KT-8803, KT-9204, KT-8701, KT-8904, and KT-0507 (trade names, manufactured by Unitika Ltd., polyester resin emulsion), Hi-Tech SN-2002 (trade name, manufactured by TOHO CHEMICAL INDUSTRY Co., Ltd., polyester resin emulsion), TAKELAK W-6020, W-635, W-6061, W-605, W-635, and W-6021 (trade names, manufactured by Mitsui Chemicals & SKC Polyurethanes Inc., urethane resin emulsion), SUPERFLEX 870, 800, 150, 420, 460, 470, 610, and 700 (trade names, manufactured by DKS Co., Ltd., urethane resin emulsion), PERMARIN UA-150 (manufactured by Sanyo Chemical Industries, Ltd., urethane resin emulsion), Sancure 2710 (manufactured by Japanese Lubrizol Corporation, urethane resin emulsion), NeoRez R-9660, R-9637, and R-940 (manufactured by Kusumoto Chemicals, Ltd., urethane resin emulsion), ADEKA BONTIGHTER HUX-380 and 290K (manufactured by ADEKA Corporation, urethane resin emulsion), Mowinyl 966A and Mowinyl 7320 (manufactured by Japan Coating Resin Corporation), Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (manufactured by BASF SE), NK binder R-5HN (manufactured by Shin-Nakamura Chemical Co., Ltd.), HYDRAN WLS-210 (non-crosslinkable polyurethane: manufactured by DIC Corporation), and Joncryl 7610 (manufactured by BASF SE). Any of these may be selected and used.

The glass transition temperature (Tg) of the resin particles is preferably −50° C. or higher and 200° C. or lower, more preferably 0° C. or higher and 150° C. or lower, and even more preferably 50° C. or higher and 100° C. or lower. Further, the glass transition temperature is particularly preferably 50° C. or higher and 80° C. or lower. When the glass transition temperature (Tg) of the resin particles is within the above range, the resin particles tend to be excellent in durability and clogging resistance. The glass transition temperature is measured, for example, using a differential scanning calorimeter "DSC7000", manufactured by Hitachi High-Tech Science Corporation, in accordance with JIS K 7121 (Testing Methods for Transition Temperatures of Plastics).

The volume average particle diameter of the resin particles is preferably 10 nm or more and 300 nm or less, more preferably 30 nm or more and 300 nm or less, even more preferably 30 nm or more and 250 nm or less, and particularly preferably 40 nm or more and 220 nm or less. The volume average particle diameter can be measured by the method described above.

The acid value of the resin contained in the resin particles is not particularly limited, and is preferably 1 to 300 KOH mg/g, more preferably 10 to 200 KOH mg/g, and even more preferably 20 to 100 KOH mg/g. When the acid value of the resin is within the above range, there is a tendency that the resin particles are likely to be anionic.

The content of the resin particles (first resin particles) in the colored ink composition is 0.1% by mass or more and 20% by mass or less, preferably 18 by mass or more and 15% by mass or less, more preferably 3% by mass or more and 7% by mass or less, and particularly preferably 3% by mass or more and 5% by mass or less, as a solid content with respect to the total mass of the colored ink composition.

1.1.1. (3) Other Components

The colored ink composition may contain the following components.

Organic Solvent

The colored ink composition used in the recording method according to the present embodiment may contain an organic solvent. The organic solvent is preferably water-soluble. One of the functions of the organic solvent is to improve the wettability of the colored ink composition with respect to a fabric or to enhance the moisture retention properties of the colored ink composition. The organic solvent can also function as a penetrant.

Examples of the organic solvent include esters, alkylene glycol ethers, cyclic esters, nitrogen-containing solvents, and polyhydric alcohols. Examples of the nitrogen-containing solvents include cyclic amides and acyclic amides. Examples of the acyclic amides include alkoxyalkylamides.

Examples of the esters include glycol monoacetates such as ethylene glycol monomethyl ether acetate, ethylene glycol monoethyl ether acetate, and ethylene glycol monobutyl ether acetate, and glycol diesters such as ethylene glycol diacetate, diethylene glycol diacetate, and propylene glycol diacetate.

The alkylene glycol ethers may be alkylene glycol monoethers or diethers, and alkyl ethers are preferable. Specific examples thereof include alkylene glycol monoalkyl ethers such as ethylene glycol monomethyl ether, ethylene glycol monoethyl ether, ethylene glycol monoisopropyl ether, ethylene glycol monobutyl ether, and diethylene glycol monomethyl ether, and alkylene glycol dialkyl ethers such as ethylene glycol dimethyl ether, ethylene glycol diethyl ether, ethylene glycol dibutyl ether, diethylene glycol dimethyl ether, and diethylene glycol diethyl ether.

Examples of the cyclic esters include cyclic esters (lactones) such as β-propiolactone, γ-butyrolactone, δ-valerolactone, ε-caprolactone, and β-butyrolactone, and compounds in which a hydrogen of a methylene group adjacent to a carbonyl group thereof is substituted with an alkyl group having 1 to 4 carbon atoms.

Examples of the alkoxyalkylamides include 3-methoxy-N, N-dimethylpropionamide, 3-methoxy-N, N-diethylpropionamide, 3-methoxy-N, N-methylethylpropionamide, 3-ethoxy-N, N-dimethylpropionamide, 3-ethoxy-N, N-diethylpropionamide, 3-ethoxy-N, N-methylethylpropionamide, 3-n-butoxy-N, N-dimethylpropionamide, 3-n-butoxy-N, N-diethylpropionamide, and 3-n-butoxy-N, N-methylethylpropionamide.

Examples of the cyclic amides include lactams, and examples thereof include pyrrolidones such as 2-pyrrolidone, 1-methyl-2-pyrrolidone, 1-ethyl-2-pyrrolidone, 1-propyl-2-pyrrolidone, and 1-butyl-2-pyrrolidone.

In addition, it is also preferable to use compounds represented by Formula (1) as the alkoxyalkylamides.

$$R^1—O—CH_2CH_2—(C=O)—NR_2R^3 \qquad (1)$$

In Formula (1), $R^1$ represents an alkyl group having 1 or more and 4 or less carbon atoms, and $R^2$ and $R^3$ each independently represent a methyl group or an ethyl group. The "alkyl group having 1 or more and 4 or less carbon atoms" may be a linear or branched alkyl group, and examples thereof include a methyl group, an ethyl group, an n-propyl group, an iso-propyl group, an n-butyl group, a sec-butyl group, an iso-butyl group, and a tert-butyl group. The compounds represented by Formula (1) may be used alone or as a mixture of two or more types thereof.

Examples of the function of the nitrogen-containing solvent include enhancing the surface dryness and fixability of the colored ink composition attached to the fabric.

The content of the nitrogen-containing solvent is not particularly limited with respect to the total mass of the colored ink composition, and is about 5% by mass or more and 50% by mass or less, and preferably 10% by mass or more and 30% by mass or less. When the content of the nitrogen-containing solvent is within the above range, the fixability and surface dryness of the image (particularly, the surface dryness when an image is recorded under an environment of high temperature and high humidity) can be further improved in some cases.

Examples of the polyhydric alcohols include 1,2-alkanediol (for example, alkanediols such as ethylene glycol, propylene glycol (alias: propane-1,2-diol), 1,2-butanediol, 1,2-pentanediol, 1,2-hexanediol, 1,2-heptanediol, and 1,2-octanediol), and polyhydric alcohols (polyols) excluding the 1,2-alkanediol (for example, diethylene glycol, dipropylene glycol, 1,3-propanediol, 1,3-butanediol (alias: 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylol propane, and glycerin).

The polyhydric alcohols can be divided into alkanediols and polyols. The alkanediols are diols of an alkane having 5 or more carbon atoms. The number of carbon atoms of the alkane is preferably 5 to 15, more preferably 6 to 10, and even more preferably 6 to 8. 1,2-alkanediol is preferable.

The polyols are polyols of alkane having 4 or less carbon atoms or intermolecular condensates of hydroxyl groups of polyols of alkane having 4 or less carbon atoms. The number of carbon atoms of the alkane is preferably 2 to 3. The number of the hydroxyl groups in the molecule of the polyols is 2 or more, preferably 5 or less, and more preferably 3 or less. When the polyols are the intermolecular condensates described above, the number of intermolecular condensates is 2 or more, preferably 4 or less, and more preferably 3 or less. The polyhydric alcohols may be used alone or as a mixture of two or more types thereof.

The alkanediols and polyols can mainly function as a penetrating solvent and/or a moisturizing solvent. However, the alkanediols tend to have strong properties as the penetrating solvent, and polyols tend to have strong properties as the moisturizing solvent.

When the colored ink composition contains an organic solvent, the organic solvent may be used alone or in combination of two or more types thereof. In addition, the total content of the organic solvent is, for example, 5% by mass or more and 50% by mass or less, preferably 10% by mass or more and 45% by mass or less, more preferably 15% by mass or more and 40% by mass or less, and even more preferably 20% by mass or more and 40% by mass or less, with respect to the total mass of the colored ink composition. When the content of the organic solvent is within the above range, the balance between wet spreadability and dryness is further improved, and an image with high image quality is easily formed.

The colored ink composition preferably contains a polyhydric alcohol, and more preferably contains a polyhydric alcohol having a normal boiling point of 250° C. or higher as the organic solvent. In addition, the content of the polyhydric alcohol having a normal boiling point of 250° C. or higher is preferably 18 by mass or more, more preferably 5% by mass or more, even more preferably 10% by mass or more, still even more preferably 13% by mass or more, and particularly preferably 15% by mass or more, with respect to the total amount of the colored ink composition. Although the upper limit is not particularly limited, the upper limit is preferably 40% by mass or less, more preferably 35% by mass or less, even more preferably 30% by mass or less, still even more preferably 25% by mass or less, and particularly preferably 20% by mass or less. When the content of the polyhydric alcohol having a normal boiling point of 250° C. or higher is within the above range, there is a tendency that the balance between moisture retention properties and dryness is excellent, and both intermittent printing stability and rubbing fastness can be improved.

Surfactant

The colored ink composition may contain a surfactant. The surfactant has a function of adjusting the surface tension of the colored ink composition and adjusting, for example, the wettability with the fabric. Among the surfactants, for example, an acetylene glycol-based surfactant, a silicone-based surfactant, and a fluorine-based surfactant can be preferably used.

The acetylene glycol-based surfactant is not particularly limited, and examples thereof include SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all trade names, manufactured by Air Products & Chemicals. Inc.), OLFINE B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all trade names, manufactured by Nissin Chemical Industry Co., Ltd.), and ACETYLENOL E00, EOOP, E40, and E100 (all trade names, manufactured by Kawaken Fine Chemicals Co., Ltd.).

The silicone-based surfactant is not particularly limited, and examples thereof preferably include a polysiloxane-based compound. The polysiloxane-based compound is not particularly limited, and examples thereof include a polyether-modified organosiloxane. Examples of commercially available products of the polyether-modified organosiloxane include BYK-306, BYK-307, BYK-333, BYK-341, BYK-345, BYK-346, and BYK-348 (all trade names, manufactured by BYK Japan KK.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all trade names, manufactured by Shin-Etsu Chemical Co., Ltd.), and SILFACE SAG002, 005, 503A, 008 (all trade names, manufactured by Nissin Chemical Industry Co., Ltd.).

As the fluorine-based surfactant, a fluorine-modified polymer is preferably used, and specific examples thereof include BYK-3440 (manufactured by BYK Japan KK.), SURFLON S-241, S-242, and S-243 (all trade names, manufactured by AGC SEIMI CHEMICAL CO., LTD.), and FTERGENT 215M (manufactured by NEOS COMPANY LIMITED).

When the colored ink composition contains a surfactant, a plurality of types of surfactants may be contained. When the colored ink composition contains the surfactant, the content thereof may be 0.1% by mass or more and 2% by mass or less, preferably 0.4% by mass or more and 1.5% by mass or less, and more preferably 0.5% by mass or more and 1.0% by mass or less, with respect to the total mass of the colored ink composition.

Wax

The colored ink composition may contain a wax. Since the wax has a function of imparting smoothness to an image by the colored ink composition, the peeling of the image due to the colored ink composition can be suppressed.

Examples of the components constituting the wax include plant or animal waxes such as carnauba wax, candelilla wax, beeswax, rice wax, and lanolin; petrolatum waxes, such as paraffin wax, microcrystalline wax, polyethylene wax, oxidized polyethylene wax, and petrolatum; mineral waxes, such as montan wax and ozokerite; synthetic waxes such as carbon wax, Hoechst wax, polyolefin wax, and stearic acid amide; and emulsions of natural synthetic waxes or compounded waxes such as an α-olefin maleic anhydride copolymer. These waxes can be used alone or a mixture of plurality of types thereof may be used. Among these, from a viewpoint of obtaining more excellent in the effect of enhancing the fixability to a soft packaging film to be described later, it is preferable to use the polyolefin wax (in particular, polyethylene wax and polypropylene wax) and the paraffin wax.

As the wax, a commercially available product can be used as it is, and examples thereof include NOPCOTE PEM-17 (trade name, manufactured by SAN NOPCO LIMITED), CHEMIPEARL W4005 (trade name, manufactured by Mitsui Chemicals, Inc.), and AQUACER 515, 539, and 593 (all trade names, manufactured by BYK Japan KK.).

The wax may be supplied in the form of an emulsion or suspension. When the wax is used, the content thereof is preferably 0.1% by mass or more and 10% by mass or less, more preferably 0.5% by mass or more and 5% by mass or less, and even more preferably 0.5% by mass or more and 2% by mass or less, with respect to the total mass of the colored ink composition, in terms of solid content. When the content of the wax is within the above range, the function of the wax can be favorably exhibited.

Additive

The colored ink composition may contain ureas, amines, saccharides and the like as additives. Examples of ureas include urea, ethyleneurea, tetramethylurea, thiourea, and 1,3-dimethyl-2-imidazolidinone, and betaines (such as trimethylglycine, triethylglycine, tripropylglycine, triisopropylglycine, N, N, N-trimethylalanine, N, N, N-triethylalanine, N, N, N-triisopropylalanine, N, N, N-trimethyl methyl alanine, carnitine, and acetyl carnitine).

Examples of the amines include diethanolamine, triethanolamine, and triisopropanolamine. The ureas or the amines may function as a pH adjuster.

Examples of the saccharides include glucose, mannose, fructose, ribose, xylose, arabinose, galactose, aldonic acid, glucitol (sorbitol), maltose, cellobiose, lactose, sucrose, trehalose, and maltotriose.

pH Adjuster

A pH adjuster can be added to the colored ink composition of the present embodiment in order to adjust the pH. The pH adjuster is not particularly limited, and examples thereof include an appropriate combination of acids, bases, weak acids, and weak bases. Examples of acids and bases used in such a combination include inorganic acids such as sulfuric acid, hydrochloric acid, and nitric acid, inorganic bases such as lithium hydroxide, sodium hydroxide, potassium hydroxide, dihydrogen potassium phosphate, hydrogen disodium phosphate, potassium carbonate, sodium carbonate, hydrogen sodium carbonate, and ammonia, organic bases such as triethanol amine, diethanol amine, monoethanol amine, tripropanol amine, triisopropanol amine, diisopropanol amine, and tris(hydroxymethyl)aminomethane (THAM), and organic acids such as adipic acid, citric acid, succinic acid, lactic acid, Good's buffers such as N, N-bis(2-hydroxyethyl)-2-aminoethanesulfonic acid (BES), 4-(2-hydroxyethyl)-1-piperazineethanesulfonic acid (HEPES), morpholinoethanesulfonic acid (MES), carbamoylmethyl iminobisacetic acid (ADA), piperazine-1,4-bis(2-ethanesulfonic acid) (PIPES), N-(2-acetamide)-2-aminoethanesulfonic acid (ACES), cholamine chloride, N-tris(hydroxymethyl)methyl-2-aminoethanesulfonic acid (TES), acetamide glycine, tricine, glycine amide, and bicine, a phosphate buffer solution, a citrate buffer solution, and a tris buffer solution. Further, among these, a tertiary amine such as triethanol amine or triisopropanol amine and a carboxy group-containing organic acid such as adipic acid, citric acid, succinic acid, or lactic acid are preferably contained as a part or the whole of the pH adjuster since the pH buffering effect can be more stably obtained.

Ureas

Ureas may be used as a moisturizer of the colored ink composition. Specific examples of the ureas include urea, ethylene urea, tetramethylurea, thiourea, and 1,3-dimethyl-2-imidazolidinone. When the ureas are contained, the content thereof may be 18 by mass or more and 10% by mass or less with respect to the total mass of the ink composition.

Saccharides

Saccharides may be used for the purpose of suppressing solidification and drying of the colored ink composition. Specific examples of saccharides include glucose, mannose, fructose, ribose, xylose, arabinose, galactose, aldonic acid, glucitol (sorbitol), maltose, cellobiose, lactose, sucrose, trehalose, and maltotriose.

Chelating Agent

A chelating agent may be used for the purpose of removing unnecessary ions in the colored ink composition. Examples of the chelating agent include ethylenediaminetetraacetic acid and salts thereof (such as ethylenediaminetetraacetic acid dihydrogen disodium salt, ethylene diamine nitrilotriacetate, hexametaphosphate, pyrophosphate, and metaphosphate).

Preservative and Fungicide

A preservative and a fungicide may be used in the colored ink composition. Examples of the preservative and the fungicide include sodium benzoate, sodium pentachlorophenolate, sodium 2-pyridinethiol-1-oxide, sodium sorbate, sodium dehydroacetate, PROXEL CRL, PROXEL BDN, PROXEL GXL, PROXEL XL-2, PROXEL IB, and PROXEL TN (trade names, all manufactured by LONZA KK.), and 4-chloro-3-methylphenol (such as PREVENTOL CMK manufactured by Bayer AG).

Rust Inhibitor

A rust inhibitor may be used in the colored ink composition. Preferable examples of the rust inhibitor include benzotriazole, acidic sulfite, sodium thiosulfate, ammonium thioglycolic acid, diisopropylammonium nitrite, pentaerythritol tetranitrate, and dicyclohexylammonium nitrite. Among these, benzotriazole is particularly suitable.

Others

The colored ink composition used in the recording method according to the present embodiment may further contain components such a viscosity adjusting agent, an antioxidant, an antifungal agent, an oxygen absorber, and a dissolution aid, as necessary.

1.1.1. (4) Physical Properties and Production of Colored Ink Composition

When the colored ink composition is attached to the fabric by an ink jet method, the viscosity of the colored ink composition at 20° C. is preferably 1.5 mPa's or more and 15 mPa·s or less, more preferably 1.5 mPa·s or more and 7 mPa·s or less, and even more preferably 1.5 mPa·s or more and 5.5 mPa·s or less. When the colored ink composition is attached to the fabric by the ink jet method, it is easy to efficiently form a predetermined image on the fabric.

The surface tension of the colored ink composition at 25° C. is 40 mN/m or less, preferably 38 mN/m or less, and more preferably 35 mN/m or less from a viewpoint of obtaining appropriate wet spreadability on the fabric. In addition, the surface tension is preferably 20 mN/m or more, and more preferably 25 mN/m or more.

The surface tension can be measured by confirming the surface tension when a platinum plate is wetted with the composition in an environment of 25° C. using an automatic surface tensiometer CBVP-Z (manufactured by Kyowa Interface Science, Co., Ltd.).

The colored ink composition is obtained by mixing the components described above in an arbitrary order and, as necessary, carrying out filtration or the like to remove impurities. As a method of mixing each component, a method of sequentially adding materials to a container equipped with a stirring device such as a mechanical stirrer and a magnetic stirrer, and performing stirring and mixing is suitably used. As a filtration method, centrifugal filtration, filter filtration, and the like can be performed as necessary.

1.1.2. Method of Attaching Colored Ink Composition to Fabric

The colored ink attachment step may be performed by any method provided that an ink jet method having a form in which the colored ink composition is attached to a fabric while an ink jet head scans the fabric is used. In the ink jet method, main scanning is performed a plurality of times for recording by moving the ink jet head in a direction perpendicular to a transport direction of the fabric. Although the details will be described later, the colored ink composition, a treatment liquid, and a non-colored ink composition are attached to the same scanning region of the fabric by the same main scanning.

The attachment amount of the colored ink composition in the colored ink attachment step is preferably 5.0 (mg/inch$^2$) or more. Further, the attachment amount of the colored ink composition is preferably 7.0 (mg/inch$^2$) or more, more preferably 9.0 (mg/inch$^2$) or more, even more preferably 10.0 (mg/inch$^2$) or more, yet even more preferably 13.0 (mg/inch$^2$) or more, and still even more preferably 15.0 (mg/inch$^2$) or more. In this manner, a colored image having more favorable color developing properties can be obtained. When the attachment amount of the colored ink composition is 10.0 (mg/inch$^2$) or more, while the color developing properties are improved, the total attachment amount of the colored ink composition, the treatment liquid described later, and the non-colored ink composition described later tends to increase.

Further, the upper limit is preferably 50.0 (mg/inch$^2$) or less, more preferably 40.0 (mg/inch$^2$) or less, and even more preferably 25.0 (mg/inch$^2$) or less.

The attachment amount of the colored ink composition described above is an amount in the recording region in which the treatment liquid, the colored ink composition, and the non-colored ink composition are attached to the recording region in an overlapping manner in the recording method of the present embodiment. In addition, the maximum attachment amount of the colored ink composition in the region may be within the above range, which is preferable.

1.2. Treatment Liquid Attachment Step

The treatment liquid attachment step is a step of attaching a treatment liquid to the fabric. The treatment liquid will be described below. The method of attachment to the fabric will be described later.

The treatment liquid may be an aqueous composition. The aqueous ink may contain, for example, a solvent component that can evaporate, in addition to water.

1.2.1. Treatment Liquid

The treatment liquid contains at least a polyvalent metal salt.

1.2.1. (1) Polyvalent Metal Salt

The treatment liquid contains a polyvalent metal salt as an aggregating agent for aggregating the components of the ink (colored ink composition and non-colored ink composition). The polyvalent metal salt has an effect of aggregating the pigment and the resin particles by reacting with components such as the pigment included in the ink and the resin particles included in the ink. However, the degree of aggregation of the pigment and the resin particles by the polyvalent metal salt varies depending on each type of the polyvalent metal salt, the pigment, and the resin particles, and can be adjusted. In addition, the polyvalent metal salt can aggregate the pigment and the resin particles by reacting with the pigment and the resin particles included in the ink. For example, such aggregation makes it possible to enhance the fixability of the resin particles and to enhance the color development of the pigment and/or to increase the viscosity of the ink.

The polyvalent metal salt is a compound formed of a divalent or higher metal ion and an anion. Examples of the divalent or higher metal ion include ions such as calcium, magnesium, copper, nickel, zinc, barium, aluminum, titanium, strontium, chromium, cobalt, and iron. Among the metal ions constituting these polyvalent metal salts, the metal ion is preferably at least one of calcium ion and magnesium ion from the viewpoint of excellent aggregating properties of the components of the ink.

The anion constituting the polyvalent metal salt is an inorganic ion or an organic ion. That is, the polyvalent metal salt in the present disclosure is formed of an inorganic ion or an organic ion and a polyvalent metal. Examples of the inorganic ion include a chloride ion, a bromine ion, an iodine ion, a nitrate ion, a sulfate ion, and a hydroxide ion. Examples of the organic ion include an organic acid ion, and examples thereof include a carboxylic acid ion.

The polyvalent metal compound is preferably an ionic polyvalent metal salt, and in particular, when the polyvalent metal salt is a magnesium salt or a calcium salt, the stability of the treatment liquid is further improved. In addition, as the counter ion of the polyvalent metal, any of an inorganic acid ion and an organic acid ion may be used.

Specific examples of the polyvalent metal salt include a calcium carbonate such as a heavy calcium carbonate and a light calcium carbonate, calcium nitrate, calcium chloride, calcium sulfate, magnesium sulfate, calcium hydroxide, magnesium chloride, magnesium carbonate, barium sulfate, chloride barium, zinc carbonate, zinc sulfide, aluminum silicate, calcium silicate, magnesium silicate, copper nitrate, calcium formate, calcium acetate, magnesium acetate, and aluminum acetate. These polyvalent metal salts may be used alone or in combination of two or more types thereof. Among these, since sufficient solubility in water can be secured and the use thereof reduces traces of the treatment liquid (makes traces less visible), at least any one of calcium formate, magnesium sulfate, calcium nitrate, and calcium chloride is preferable, and magnesium sulfate is more preferable. In addition, these metal salts may have hydration water in the form of a raw material. A plurality of types of these polyvalent metal salts may be used.

The total content of the polyvalent metal salt in the treatment liquid is, for example, 0.1% by mass or more and 20% by mass or less, preferably 1% by mass or more and 20% by mass or less, and more preferably 18 by mass or more and 9% by mass or less, with respect to the total mass of the treatment liquid. When the content of the polyvalent metal salt is 1% by mass or more, the polyvalent metal salt can sufficiently aggregate the components contained in the ink. In addition, when the content of the polyvalent metal salt is 30% by mass or less, the solubility and dispersibility of the polyvalent metal salt in the treatment liquid are further improved, and the storage stability of the treatment liquid or the like can be improved.

Even when the organic solvent contained in the treatment liquid has high hydrophobicity, from the viewpoint of favorable solubility of the polyvalent metal salt in the treatment liquid, it is preferable to use a polyvalent metal salt whose solubility in 100 g of water at 25° C. is 1 g or more, and more preferable to use a polyvalent metal salt whose solubility is 3 g or more and 80 g or less.

1.2.1. (2) Other Components

The treatment liquid may contain an organic solvent, a surfactant, an additive, and other components. These components are the same as those described in the section "1.1.1. (3) Other Components" of "1.1.1. Colored Ink Composition", and the description thereof will be omitted by replacing "colored ink composition" in the same section with "treatment liquid".

1.2.1. (3) Physical Properties and Production of Treatment Liquid

When the treatment liquid is attached to the fabric by an ink jet method, the viscosity of the treatment liquid at 20° C. is preferably 1.5 mPa·s or more and 15 mPa's or less, more preferably 1.5 mPa·s or more and 7 mPa·s or less, and even more preferably 1.5 mPa's or more and 5.5 mPa·s or less. When the treatment liquid is attached to the fabric by the ink jet method, it is easy to efficiently form a predetermined image on the fabric.

The surface tension of the treatment liquid at 25° C. is 40 mN/m or less, preferably 38 mN/m or less, and more preferably 35 mN/m or less from a viewpoint of obtaining appropriate wet spreadability on the fabric. In addition, the surface tension is preferably 20 mN/m or more, and more preferably 25 mN/m or more.

The surface tension can be measured by confirming the surface tension when a platinum plate is wetted with the composition in an environment of 25° C. using an automatic surface tensiometer CBVP-Z (manufactured by Kyowa Interface Science, Co., Ltd.).

The treatment liquid is obtained by mixing the components described above in an arbitrary order and, as necessary, carrying out filtration or the like to remove impurities. As a method of mixing each component, a method of sequentially adding materials to a container equipped with a stirring device such as a mechanical stirrer and a magnetic stirrer, and performing stirring and mixing is suitably used. As a filtration method, centrifugal filtration, filter filtration, and the like can be performed as necessary.

1.2.2. Method of Attaching Treatment Liquid to Fabric

The treatment liquid attachment step may be performed by any method provided that an ink jet method having a form in which the treatment liquid is attached to the fabric while an ink jet head scans the fabric is used. In the ink jet method, main scanning is performed a plurality of times for recording by moving the ink jet head in a direction perpendicular to a transport direction of the fabric. Although the details will be described later, the colored ink composition, a treatment liquid, and a non-colored ink composition are attached to the same scanning region of the fabric by the same main scanning.

The treatment liquid attachment step is performed such that the attachment amount of the polyvalent metal salt in the treatment liquid to the fabric is 0.3 (mg/inch$^2$) or more. The attachment amount of the polyvalent metal salt to the fabric in the treatment liquid attachment step is more preferably 0.5 (mg/inch$^2$) or more, and even more preferably 0.9 (mg/inch$^2$) or more. With such an attachment amount, even when the colored ink composition, the treatment liquid, and the non-colored ink composition are attached to the same scanning region of the fabric by the same main scanning, the components of the ink (colored ink composition and non-colored ink composition) can be favorably aggregated, and the strike-through can be favorably suppressed.

On the other hand, the attachment amount of the polyvalent metal salt is preferably 1.7 (mg/inch$^2$) or less, more preferably 1.5 (mg/inch$^2$) or less, and even more preferably 1.0 (mg/inch$^2$) or less. In this manner, the color developing properties of an image can be further improved.

The attachment amount of the treatment liquid in the treatment liquid attachment step can be adjusted as long as the attachment amount of the polyvalent metal salt to the fabric is 0.3 (mg/inch$^2$) or more, but the attachment amount is preferably 5.0 (mg/inch$^2$) or more. Further, the attachment amount is preferably 6.0 (mg/inch$^2$) or more, more preferably 9.0 (mg/inch$^2$) or more, even more preferably 10.0 (mg/inch$^2$) or more, yet even more preferably 12.0 (mg/inch$^2$) or more, and still even more preferably 15.0 (mg/inch$^2$) or more. In this manner, a colored image having more favorable color developing properties can be obtained. With such an attachment amount, even when the colored ink composition, the treatment liquid, and the non-colored ink composition are attached to the same scanning region of the fabric by the same main scanning, the components of the ink (colored ink composition and non-colored ink composition) can be favorably aggregated, and the strike-through can be favorably suppressed.

In addition, the upper limit is preferably 25.0 (mg/inch$^2$) or less, more preferably 18.0 (mg/inch$^2$) or less, and even more preferably 15.0 (mg/inch$^2$) or less.

The attachment amount of the treatment liquid described above is an amount in the recording region in which the treatment liquid, the colored ink composition, and the non-colored ink composition are attached to the recording region in an overlapping manner in the recording method of the present embodiment. In addition, the maximum attachment amount of the treatment liquid in the region may be within the above range, which is preferable.

1.3. Non-Colored Ink Attachment Step

The non-colored ink attachment step is a step of attaching a non-colored ink composition to the fabric. Hereinafter, the non-colored ink composition will be described. The method of attachment to the fabric will be described later.

The non-colored ink composition may be an aqueous ink. The aqueous ink may contain, for example, a solvent component that can evaporate, in addition to water. Further, the aqueous ink may be an aqueous resin ink containing a resin. With such an ink, the solvent component is dried and evaporated from the ink attached to the fabric, and a component such as resin remains on the fabric to perform recording.

1.3.1. Non-Colored Ink Composition

The non-colored ink composition contains at least anionic second resin particles. The non-colored ink composition corresponds to a so-called clear ink.

The non-colored ink composition (hereinafter, also referred to as "clear ink", "overcoat liquid" or "coating liquid") is different from the above-described colored ink composition or the above-described treatment liquid used for fabric coloring, and is used for improving fastness such as rubbing fastness and washing fastness by applying the non-colored ink composition to a printed portion such as a fabric and protecting the printed portion. The non-colored ink composition may contain the above-described coloring material, and the content thereof is preferably 0.2% by mass or less, more preferably 0.1% by mass or less, and even more preferably 0.05% by mass or less, with respect to the total amount of the non-colored ink composition, and a lower limit is 0% by mass. The non-colored ink composition preferably does not contain the coloring material.

1.3.1. (1) Second Resin Particles

The non-colored ink composition contains resin particles. In the present specification, the resin particles included in the non-colored ink composition are referred to as second resin particles. The non-colored ink composition may be an aqueous resin clear ink. The resin particles can further improve the adhesion of an image due to the non-colored ink composition attached to the fabric. As the anionic resin particles, for example, there may be mentioned resin particles having anionic properties among resin particles formed of a urethane resin, an acrylic resin (including styrene-acrylic resin), a fluorene resin, a polyolefin resin, a rosin-modified resin, a terpene resin, a polyester resin, a polyamide resin, an epoxy resin, a vinyl chloride resin, a vinyl chloride-vinyl acetate copolymer, an ethylene vinyl acetate resin, and the like. Among these, a urethane resin, an acrylic resin, a polyolefin resin, and a polyester resin are preferable. These resin particles are often handled in the form of an emulsion, but may be in the form of powder. In addition, the resin particles can be used alone or in combination of two or more types thereof.

The content of the second resin particles with respect to the total amount of the non-colored ink composition is higher than the content of the first resin particles with respect to the total amount of the colored ink composition. The content of the resin particles (second resin particles) in the non-colored ink composition is 0.1% by mass or more and 20% by mass or less, preferably 3% by mass or more and 20% by mass or less, more preferably 8% by mass or more and 20% by mass or less, with respect to the total mass of the non-colored ink composition, as a solid content.

With such a configuration, the non-colored ink composition can have favorable rubbing fastness even with a small attachment amount as described later.

The second resin particles contained in the non-colored ink composition are the same as those described in the section "1.1.1. (2) First Resin Particles" of "1.1.1. Colored Ink Composition", and the description thereof will be omitted by replacing "colored ink composition" in the same section with "non-colored ink composition".

The second resin particles may contain the same resin as that of the first resin particles described above, and may contain a different resin.

Similar to the first resin particle described above, the second resin particle preferably contains a urethane resin or a (meth)acrylic resin, and more preferably contains a urethane resin, and the second resin particle is even more preferably a urethane resin. When the second resin particle contains a urethane resin, the second resin particle is preferably a urethane resin. Therefore, this urethane resin can react with a cationic compound, such as a cationic polymer, which can be contained in the treatment liquid described above, the aggregation and thickening effect is further promoted, the coating liquid layer is further made tougher thereby, and the rubbing fastness, the strike-through (bleeding) suppression, and the like are further improved in some cases.

1.3.1. (2) Other Components

The non-colored ink composition may contain an organic solvent, a surfactant, an additive, and other components. These components are the same as those described in the section "1.1.1. (3) Other Components" of "1.1.1. Colored Ink Composition", and the description thereof will be omitted by replacing "colored ink composition" in the same section with "non-colored ink composition".

Since the content of the second resin particles with respect to the total amount of the non-colored ink composition is higher than the content of the first resin particles with respect to the total amount of the colored ink composition, the ejection stability when the non-colored ink composition is ejected by the ink jet method, in particular, intermittent printing stability deteriorates in some cases. However, when a polyhydric alcohol having a normal boiling point of 250° C. or higher is contained as the organic solvent, the ejection stability and the intermittent printing stability can be improved, which is preferable.

When the non-colored ink composition contains the polyhydric alcohol having a normal boiling point of 250° C. or higher, the content thereof is the same as the content of the polyhydric alcohol having a normal boiling point of 250° C. or higher contained in the colored ink composition, and may be different.

The content of the polyhydric alcohol having a normal boiling point of 250° C. or higher is preferably 5% by mass or more, more preferably 10% by mass or more, even more preferably 13% by mass or more, yet even more preferably 15% by mass or more, and particularly preferably 20% by mass or more.

The content of the polyhydric alcohol having a normal boiling point of 250° C. or higher contained in the non-colored ink composition is preferably higher than the content of the polyhydric alcohol having a normal boiling point of 250° C. or higher contained in the colored ink composition. With such a configuration, the rubbing fastness, strike-through, color development, and intermittent printing stability can be further improved.

1.3.1. (3) Physical Properties and Production of Non-Colored

Ink Composition

When the non-colored ink composition is attached to the fabric by an ink jet method, the viscosity of the non-colored ink composition at 20° C. is preferably 1.5 mPa·s or more and 15 mPa·s or less, more preferably 1.5 mPa's or more and 7 mPa·s or less, and even more preferably 1.5 mPa·s or more and 5.5 mPa's or less. When the non-colored ink composition is attached to the fabric by the ink jet method, it is easy to efficiently form a predetermined image on the fabric.

The surface tension of the non-colored ink composition at 25° C. is 40 mN/m or less, preferably 38 mN/m or less, and more preferably 35 mN/m or less from the viewpoint of obtaining appropriate wet spreadability on the fabric. In addition, the surface tension is preferably 20 mN/m or more, and more preferably 25 mN/m or more.

The surface tension can be measured by confirming the surface tension when a platinum plate is wetted with the composition in an environment of 25° C. using an automatic surface tensiometer CBVP-Z (manufactured by Kyowa Interface Science, Co., Ltd.).

The non-colored ink composition is obtained by mixing the components described above in an arbitrary order and, as necessary, carrying out filtration or the like to remove impurities. As a method of mixing each component, a method of sequentially adding materials to a container equipped with a stirring device such as a mechanical stirrer and a magnetic stirrer, and performing stirring and mixing is suitably used. As a filtration method, centrifugal filtration, filter filtration, and the like can be performed as necessary.

1.3.2. Method of Attaching Non-colored Ink Composition to Fabric

The non-colored ink attachment step may be performed by any method provided that an ink jet method having a form in which the non-colored ink composition is attached to the fabric while an ink jet head scans the fabric is used. In the ink jet method, main scanning is performed a plurality of times for recording by moving the ink jet head in a direction perpendicular to a transport direction of the fabric. Although the details will be described later, the colored ink composition, a treatment liquid, and a non-colored ink composition are attached to the same scanning region of the fabric by the same main scanning.

The attachment amount of the non-colored ink composition in the non-colored ink attachment step is preferably 5.0 (mg/inch$^2$) or more. Further, the attachment amount is preferably 7.0 (mg/inch$^2$) or more, more preferably 9.0 (mg/inch$^2$) or more, even more preferably 10.0 (mg/inch$^2$) or more, yet more preferably 12.0 (mg/inch$^2$) or more, and still more preferably 15.0 (mg/inch$^2$) or more. In this manner, a colored image having more favorable color developing properties can be obtained.

In addition, the upper limit is preferably 25.0 (mg/inch$^2$) or less, more preferably 18.0 (mg/inch$^2$) or less, and even more preferably 15.0 (mg/inch$^2$) or less.

The attachment amount of the non-colored ink composition described above is an amount in the recording region in which the treatment liquid, the colored ink composition, and the non-colored ink composition are attached to the recording region in an overlapping manner in the recording method of the present embodiment. In addition, the maximum attachment amount of the non-colored ink composition in the region may be within the above range, which is preferable.

1.4. Fabric

The fabric is not particularly limited. The material constituting the fabric is not particularly limited, examples thereof include natural fibers such as cotton, linen, wool, and silk, synthetic fibers such as polypropylene, polyester, acetate, triacetate, polyamide, and polyurethane, and biodegradable fibers such as polylactic acid, and blended fibers thereof may be used. As the fabric, the fibers listed above may be in any form such as a woven fabric, a knitted fabric, and a nonwoven fabric, and may be blended or woven.

The fabric preferably has a hydroxyl group. Examples of such a fabric include a fabric including cellulose such as cotton and linen, and a fabric including polyurethane. When the fabric has a hydroxyl group, a crosslinking reaction can occur between a cationic compound contained in the treatment liquid and the hydroxyl group of the fabric, and the effect of improving color developing properties by thickening aggregation and the effect of improving rubbing fastness by improving adhesion between the fabric and the recording layer can be obtained in some cases.

As the fabric, the fiber may be any form of a woven fabric, a knitted fabric, a nonwoven fabric, and the like. In addition, the basis weight of the fabric used in the present embodiment is not particularly limited, and may be 1.0 oz or more and 10.0 oz or less, preferably 2.0 oz or more and 9.0 oz or less, more preferably 3.0 oz or more and 8.0 oz or less, and even more preferably 4.0 oz or more and 7.0 oz or less. When the basis weight of the fabric is within such a range, favorable recording can be performed. In addition, in the textile printing recording method according to the present embodiment, a plurality of types of fabrics having different basis weights can be applied, and favorable printing can be performed.

In the present embodiment, examples of the form of the fabric include cloth, garment and other clothing ornaments, and the like. The cloth includes a woven fabric, a knitted fabric, a nonwoven fabric, and the like. Garment and other clothing ornaments include sewn T-shirts, handkerchiefs, scarves, towels, handbags, and fabric furniture such as bags, curtains, sheets, bedspreads, and wallpaper, cloth before and after cutting as parts to be sewn, and the like. Examples of these forms include a long roll-shaped product, a product cut into a predetermined size, and a product having the shape of a manufactured product.

As the fabric, a cotton fabric pre-colored with a dye may be used. Examples of dyes with which the fabric is pre-colored include water-soluble dyes such as acidic dyes and basic dyes, disperse dyes used in combination with dispersants, and reactive dyes. When the cotton fabric is used as the fabric, a reactive dye suitable for dyeing cotton is preferably used.

In the fabric, the pigment is easily settled inside the fabric. In particular, when the treatment liquid, the colored ink composition, and the non-colored ink composition are attached to the same scanning region of the fabric by the same main scanning by the ink jet method, the amount of moisture to be attached is increased, and strike-through easily occurs. However, with the configuration of the present disclosure, strike-through can be suppressed and color developing properties can be improved.

1.5. Attachment amount of Each Component

The ink jet textile printing recording method according to the present embodiment is performed such that the attachment amount of the non-colored ink composition by the non-colored ink attachment step is smaller than the attachment amount of the colored ink composition by the colored ink attachment step.

With such an attachment amount, even when the treatment liquid, the colored ink composition, and the non-colored ink composition are attached to the same scanning region of the fabric by the same main scanning by the ink jet method, the amount of moisture to be attached can be minimized, and strike-through can be favorably suppressed. In addition, as described above, in the non-colored ink composition, since the content of the second resin particles with respect to the total amount of the non-colored ink composition is higher than the content of the first resin particles with respect to the total amount of the colored ink composition, the rubbing fastness can be improved with a small attachment amount.

In terms of the mass ratio, the attachment amount of the non-colored ink composition is preferably 0.9 or less, and more preferably 0.8 or less, with respect to the attachment amount of the colored ink composition. In this manner, strike-through can be further suppressed, and the color development and rubbing fastness of an image.

When the attachment amount of the colored ink composition is 10 (mg/inch$^2$) or more, even in a region in which the attachment amount of the colored ink composition is relatively large, which is a region in which strike-through more easily occurs, strike-through can be suppressed, and the color development and rubbing fastness of an image can be improved.

The total attachment amount of the treatment liquid, the colored ink composition, and the non-colored ink composition is preferably 70 (mg/inch$^2$) or less, and more preferably 60 (mg/inch$^2$) or less. In this manner, strike-through is more easily suppressed. In addition, the color development and rubbing fastness of an image can be improved.

On the other hand, the total attachment amount of the treatment liquid, the colored ink composition, and the non-colored ink composition is preferably 30 (mg/inch$^2$) or more, and more preferably 40 (mg/inch$^2$) or more. With such an attachment amount, strike-through is suppressed, and the color development and rubbing fastness of an image can be improved.

The total attachment amount of the treatment liquid, the colored ink composition, and the non-colored ink composition in one main scanning is preferably 45 (mg/inch$^2$) or less, more preferably 35 (mg/inch$^2$) or less, and even more preferably 25 (mg/inch$^2$) or less. In this manner, strike-through can be further suppressed, and the color development and rubbing fastness of an image.

In addition, it is preferable that $0.5 \geq A/(B+C)$ . . . (I), where the attachment amount of the pigment in the colored ink composition is denoted as A (mg/inch$^2$), the attachment amount of the first resin particles is denoted as B (mg/inch$^2$), and the attachment amount of the second resin particles in the non-colored ink composition is denoted as C (mg/inch$^2$).

In this manner, an image having more favorable rubbing fastness can be obtained.

Further, it is preferable that $0.1 \leq D/(A+B+C)$ . . . (II), where the attachment amount of the pigment in the colored ink composition is denoted as A (mg/inch$^2$), the attachment amount of the first resin particles is denoted as B (mg/inch$^2$), the attachment amount of the second resin particles in the non-colored ink composition is denoted as C (mg/inch$^2$), and the attachment amount of the polyvalent metal salt in the treatment liquid is denoted as D (mg/inch$^2$).

In this manner, strike-through can be further suppressed, and an image having more favorable rubbing fastness can be obtained.

1.6. Other Steps

The ink jet textile printing recording method of the present embodiment includes steps of attaching the treatment liquid, the colored ink composition, and the non-colored ink composition to a fabric, respectively. However, the ink jet textile printing recording method may further include a step of attaching one or more types of the treatment liquid, the colored ink composition, and the non-colored ink composition to the fabric, as necessary. In this case, the order and number of these steps are not limited, and can be appropriately performed as necessary. In addition, it is preferable to attach the treatment liquid and the ink to the same region on the fabric as each other.

The surface temperature of the fabric at the time of attaching the treatment liquid and the ink composition to the fabric is preferably 45° C. or lower, and more preferably 20° C. or higher and 45° C. or lower. Further, the surface temperature is preferably 27.0° C. or higher and 40° C. or lower, and more preferably 28° C. or higher and 30° C. or lower. The temperature is a surface temperature of the portion of the recording surface of the fabric, on which liquid attachment is applied in the attachment step, and is the highest temperature of the attachment step in the recording region. When the surface temperature is within the above range, the surface temperature is more preferably from a viewpoint of image quality, scratch resistance, and suppression of clogging.

The textile printing recording method according to the present embodiment may include a step of heating the fabric after the treatment liquid attachment step, the colored ink attachment step, and the non-colored ink attachment step described above. The heating method is not particularly limited, and examples thereof include a heat press method, a normal pressure steam method, a high pressure steam method, and a thermofix method. A heat source at the time of heating is not particularly limited, and for example, an infrared lamp and the like can be used. The heating temperature is preferably a temperature at which the first resin particles and the second resin particles are fused and moisture or the like evaporates. For example, the heating temperature is preferably 100° C. or higher and 200° C. or lower, more preferably 170° C. or lower, and even more preferably 160° C. or lower. Here, the heating temperature in the heating step refers to a surface temperature of an image and the like formed at the fabric. The time for performing heating is not particularly limited, and is, for example, 30 seconds or more and 20 minutes or less.

After the heating step, a step of washing the textile printed fabric with water and drying the printed fabric may be provided. In washing with water, as necessary, as a soaping treatment, components such as ink not fixed on the fabric may be washed away using a hot soap liquid and the like.

1.7. Attachment Form

The treatment liquid attachment step, the colored ink attachment step, and the non-colored ink attachment step described above, which are included in the textile printing recording method according to the present embodiment, are performed by an ink jet method, and the ink jet method performs main scanning for performing recording by moving the ink jet head in a direction perpendicular to a transport direction of the fabric.

The ink jet method is a recording method in which a liquid droplet of ink or the like is ejected from a nozzle of an ink jet head of an ink jet recording apparatus and the like and applied to a recording medium. Here, the main scanning for performing recording by moving the ink jet head in the direction perpendicular to the transport direction of the fabric is, for example, scanning for performing recording while a carriage 43 having an ink jet head 42 reciprocally moves in a direction (Y axis direction) perpendicular to a transport direction (+X axis direction) of a fabric 95 in the recording apparatus in FIG. 1.

The number of times of the main scanning is not particularly limited, and is, for example, 2 or more, preferably 4 or more, and more preferably 8 or more. In addition, the upper limit of the number of times of the main scanning is not particularly limited, and is, for example, preferably 32 or less, and more preferably 16 or less.

1.7.1. Simultaneous Attachment

The textile printing recording method according to the present embodiment includes simultaneous attachment of attaching the treatment liquid, the colored ink composition, and the non-colored ink composition described above to the same scanning region of the fabric by the same main scanning.

According to the simultaneous attachment, since a layer containing the treatment liquid, the colored ink composition, and the non-colored ink composition can be formed by the same main scanning, the step can be simplified, and the size of the recording apparatus can be reduced.

In the simultaneous attachment, it is preferable that the same main scanning is performed a plurality of times on the same scanning region. With this, since the treatment liquid and the colored ink composition are alternately overlapped and laminated (overlapped in the form of mille-feuille), the components of both are more easily mixed and the reaction more easily proceeds. Therefore, the thickening and aggregation of the ink is further promoted, and the ink component more easily stays in the vicinity of the surface of the fabric, which tends to further contribute to the suppression of strike-through, and to further improve color developing properties.

In addition, since the main scanning is performed a plurality of times, the attachment amount of the treatment liquid, the colored ink composition, and the non-colored ink composition in one scanning can be reduced, and there is a tendency that the amount of moisture to be attached to the fabric can be prevented from becoming excessively increased in one scanning to contribute to the suppression of strike-through.

When the same main scanning is performed a plurality of times on the same scanning region, the main scanning for attaching the colored ink composition and the treatment liquid to the fabric passes over the same region of the fabric a plurality of times. As the number of times of scanning increases, the colored ink composition and the treatment liquid can be attached to the desired region a plurality of times (in a plurality of times of pass), and there is a tendency that the image quality of a recorded matter to be obtained is further improved.

In addition, when recording is performed on any region, the number of passing times of the ink jet head on the region described above is also referred to as "pass" in some cases. For example, when the main scanning for attaching the colored ink composition and the treatment liquid to the fabric is performed four times on the same region, the number of pass is referred to as four pass and the like. For example, in FIG. 2, when the length of one sub-scanning in a sub-scanning direction (+X axis direction) is one fourth of the length of a nozzle row in the sub-scanning direction (+X axis direction), four scannings are performed on a rectangular scanning region having a length of the one sub-scanning in the sub-scanning direction (+X axis direction) and extending in the main scanning direction (Y axis direction). The number of times of scanning when viewed as described above is referred to the number of scanning, the number of pass, or the like. The number of times of scanning in the simultaneous attachment is one or more, preferably two or more, more preferably three or more, and even more preferably four or more. In addition, the upper limit of the number of times of scanning in the simultaneous attachment is not particularly limited, and is preferably 12 or less, and more preferably 8 or less. According to the textile printing recording method according to the present embodiment, even when the number of times of scanning in the simultaneous attachment is within the above range, there is a tendency that favorable color developing properties and rubbing fastness can be obtained, and favorable bleeding (strike-through) suppression can be obtained.

In addition, in the simultaneous attachment, by a main scanning different from the main scanning for forming the layer containing the colored ink composition and the treatment liquid, a layer containing the treatment liquid is formed, and the layer containing the colored ink composition and the treatment liquid and the layer containing the treatment liquid may be formed so as to be laminated to each other. As described above, since the layer containing the treatment liquid is formed, the color developing properties and the rubbing fastness are further excellent in some cases. Although the formation of the layer containing the treatment liquid may be performed before or after the formation of the layer containing the colored ink composition and the treatment liquid, the formation of the layer containing the treatment liquid is preferably performed before the formation of the layer containing the colored ink composition and the treatment liquid.

1.7.2. Colored Ink Attachment Step and Treatment Liquid Attachment Step

As described above, in the textile printing recording method according to the present embodiment, the time difference between the colored ink attachment step and the treatment liquid attachment step described above is preferably within 5 seconds. When the colored ink attachment step and the treatment liquid attachment step are performed with such a time difference, a wet-on-wet method can be performed such that the second liquid droplet to be attached later is attached to the fabric before the first liquid droplet to be attached first is dried. When the first liquid droplet is the colored ink composition, the second liquid droplet is the treatment liquid, and when the first liquid droplet is the treatment liquid, the second liquid droplet is the colored ink composition. In the wet-on-wet method, although advantages such as reduction in size of apparatus and high speed operation are obtained, there are problems of the occurrence of bleeding, and deterioration in color developing properties, and rubbing fastness. However, according to the textile printing recording method according to the present embodiment, even when the wet-on-wet method as described above is used, the color developing properties and the rubbing fastness can be made excellent, and the bleeding can also be suppressed. In addition, in the textile printing recording method according to the present embodiment, when the time difference is within 5 seconds, there is a tendency that the reaction between the colored ink composition and the treatment liquid more easily proceeds, and color developing properties and rubbing fastness become further excellent.

In the present disclosure, the "time difference between the colored ink attachment step and the treatment liquid attachment step" indicates a time difference between the last ejection of the treatment liquid and the first ejection of the colored ink composition. In particular, the time difference indicates a time difference between the last ejection of the treatment liquid and the first ejection of the colored ink composition with respect to the same scanning region of the fabric.

The time difference between the colored ink attachment step and the treatment liquid attachment step in the simultaneous attachment is preferably 1 second or less, more preferably 0.7 seconds or less, and even more preferably 0.4 seconds or less. On the other hand, the time difference between the colored ink attachment step and the treatment liquid attachment step is preferably 0.1 seconds or less, and more preferably 0.05 seconds or less. Although the lower limit is not particularly limited, the lower limit is preferably 0.01 seconds or more, and more preferably 0.1 seconds or more. The time difference between the colored ink attachment step and the treatment liquid attachment step is particularly preferably 0.3 seconds. With such a time difference, there is a tendency that the reaction between the colored ink composition and the treatment liquid more easily proceeds, and color developing properties, rubbing fastness, and strike-through suppression become more excellent.

1.7.3. Step Performing Position

In the textile printing recording method according to the present embodiment, the colored ink attachment step, the treatment liquid attachment step, and the non-colored ink attachment step described above are preferably performed on the same support. Since the steps described above are performed on the same support, the textile printing recording method according to the present embodiment can be more simplified. However, there is a problem in that the ink composition and the treatment liquid each struck through the fabric cause an aggregation reaction therebetween on the support to cause a problem of contamination of the support. In particular, in a method in which the ink, the treatment liquid, and the coating liquid are recorded by a wet-on-wet method, the strike-through easily occurs, and the support is seriously contaminated. On the other hand, according to the textile printing recording method according to the present embodiment, since the strike-through can be favorably suppressed, the contamination on the support can also be favorably suppressed.

As the support, any material that can support and transport the fabric and perform the steps may be used without any particular limitation, and a belt provided with an adhesive layer is preferably used as the support. When the belt provided with an adhesive layer is used, since the fabric can be fixed and stably transported, transportation accuracy of the fabric can be enhanced. However, since the adhesive layer easily traps aggregates formed from the ink composition and the treatment liquid, and in addition, the treatment liquid struck through the fabric, and the adhesive layer react with each other, washing is difficult to perform. On the other hand, according to the textile printing recording method according to the present embodiment, since the strike-through can be favorably suppressed, the washing is easily performed, and hence, the belt provided with an adhesive layer can be more suitably used.

As the adhesive layer, for example, a glue agent containing a polyvinyl alcohol (PVA) or the like, a hot melt-based adhesive containing a thermoplastic elastomer SIS (styreneisoprene-styrene) as a primary component, and the like can be used. A commercially available product may also be used as the adhesive layer, and examples thereof include "Polix Resin", "Newdine", or "Aquadine" Series manufactured by Yokohama Polymer Research Institute, "MC Polymer Series" manufactured by Murayama Chemical Laboratory Co., Ltd; "Unikenzol RV-30 (for screen printing)" manufactured by Union Chemical Industry Co., Ltd., "Plaster EH" manufactured by Shin-Nakamura Chemical Co., Ltd., and "ATRASOL GP1 (ATR code: ATR1717)" manufactured by ATR Chemicals.

From the viewpoint of washing easiness and the like, as the belt used as the support, an endless belt in which both end portions of a strip-shaped belt are coupled to form an endless shape is preferably used.

1.8. Ink Jet Textile Printing Apparatus

An ink jet textile printing apparatus according to the present embodiment includes an attachment mechanism that performs the colored ink attachment step, an attachment mechanism that performs the non-colored ink attachment step, and an attachment mechanism that performs the treatment liquid attachment step, and performs the ink jet textile printing recording method described above.

An example of an ink jet textile printing apparatus (recording apparatus) which includes an ink jet head and which is configured to be applicable to the textile printing recording method according to the present embodiment will be described with reference to FIG. 1.

In addition, the scales of each layer and each member shown in FIG. 1 are made different from the actual scales thereof so as to be visually recognized in the drawing. In addition, for the convenience of illustration in FIG. 1, as three axes orthogonal to each other, an X axis, a Y axis, and a Z axis are shown, a front end side of each arrow indicating an axial direction shown in the drawing is represented by "+ side", and a base end side thereof is represented by "− side". A direction parallel to the X axis, a direction parallel to the Y axis, and a direction parallel to the Z axis are represented by "X axis direction", "Y axis direction", and "Z axis direction", respectively.

1.8.1. Overall Schematic Configuration

FIG. 1 is a schematic view showing a schematic overall configuration of a recording apparatus 100. First, the overall configuration of the recording apparatus 100 will be described with reference to FIG. 1.

FIG. 1 is a schematic view showing a schematic overall configuration of a recording apparatus 100. First, the overall configuration of the recording apparatus 100 will be described with reference to FIG. 1.

As shown in FIG. 1, the recording apparatus 100 includes a medium transport portion 20, a medium adhesion portion 60, a belt support portion 91, a print portion 40, a heating unit 27, a washing unit 50, and the like. In the recording apparatus 100, at least one of the medium adhesion portion 60 and the belt support portion 91 corresponds to a heating portion to heat an endless belt 23. In addition, the recording apparatus also includes a control portion 1 to control each of these portions described above. Each portion of the recording apparatus 100 is attached to a frame portion 90.

In addition, when the heating portion to heat the endless belt is provided, the heating portion may be provided upstream than the print portion 40 in the transport direction and may also be provided at a place different from those of the medium adhesion portion 60 and the belt support portion 91. For example, the heating portion may be located upstream than the medium adhesion portion 60 in the transport direction. With such a configuration, the heating portion can also dry the endless belt 23 wetted in the washing. In addition, the heating portion may be a portion to heat the endless belt in a non-contact manner.

The medium transport portion 20 transports the fabric 95 in the transport direction. The medium transport portion 20 includes a medium supply portion 10, transport rollers 21 and 22, the endless belt 23, a belt rotation roller 24, a belt drive roller 25 functioning as a drive roller, transport rollers 26 and 28, and a medium recovery portion 30.

1.8.2. Medium Transport Portion

First, the transport path of the fabric 95 from the medium supply portion 10 to the medium recovery portion 30 will be described. In addition, in FIG. 1, a direction along a direction in which the gravity works is represented by the Z axis direction, a direction in which the fabric 95 is transported in the print portion 40 is represented by the +X axis direction, and a width direction of the fabric 95 intersecting both the Z axis direction and the X axis direction is represented by the Y axis direction. Further, the positional relationship along the transport direction of the fabric 95 or the moving direction of the endless belt 23 is also represented by "upstream" or "downstream".

The medium supply portion 10 is a portion to supply the fabric 95 on which an image is to be formed to a print portion 40 side. The medium supply portion 10 includes a supply shaft portion 11 and a bearing portion 12. The supply shaft portion 11 is formed to have a cylindrical shape or a columnar shape and is provided to be rotatable in a circumferential direction. The strip-shaped fabric 95 is wound around the supply shaft portion 11 in a roll shape. The supply shaft portion 11 is detachably attached to the bearing portion 12. Accordingly, the fabric 95 wound around the supply shaft portion 11 in advance can be attached to the bearing portion 12 together with the supply shaft portion 11.

The bearing portion 12 rotatably supports both ends of the supply shaft portion 11 in a shaft direction. The medium supply portion 10 includes a rotation drive portion (not shown) that rotatably drives the supply shaft portion 11. The rotation drive section rotates the supply shaft portion 11 in a direction to which the fabric 95 is supplied. The operation of the rotation drive portion is controlled by the control portion 1. The transport rollers 21 and 22 relay the fabric 95 from the medium supply portion 10 to the endless belt 23.

The endless belt 23 is held between at least two rollers to rotate the endless belt 23, and since the endless belt 23 is rotationally moved, the fabric 95 is transported in the transport direction (+X axis direction) while being supported by the endless belt 23. Specifically, the endless belt 23 is a seamless belt formed such that both end portions of a strip-shaped belt are seamlessly coupled to each other and is set between two rollers of the belt rotation roller 24 and the belt drive roller 25.

The endless belt 23 is held in a state where a predetermined tension is applied thereto so that a portion between the belt rotation roller 24 and the belt drive roller 25 is held flat along the horizontal direction. An adhesive 29 provided for adhesion of the fabric 95 is applied to a surface (support surface) 23a of the endless belt 23. That is, the endless belt 23 is provided with an adhesive layer formed from the adhesive 29. The fabric 95 is attached to the endless belt 23 with the adhesive 29 interposed therebetween. The endless belt 23 supports (holds) the fabric 95 which is supplied from the transport roller 22 and which is in close contact with the adhesive 29 by the medium adhesion portion 60.

The adhesive 29 preferably increases its adhesiveness by heating. Since the adhesive 29 which increases its adhesiveness by heating is used, the fabric 95 can be preferably in close contact with the adhesive layer. As the adhesive 29 as described above, for example, the hot melt-based adhesive described above which contains a thermoplastic elastomer SIS (styrene-isoprene-styrene) as a primary component may be mentioned.

The belt rotation roller 24 and the belt drive roller 25 support an inner circumferential surface 23b of the endless belt 23. Between the belt rotation roller 24 and the belt drive roller 25, a contact portion 69 to support the endless belt 23, the belt support portion 91, and a platen 46 are provided. The contact portion 69 is provided in a region facing a press portion 61 which will be described later with the endless belt 23 interposed therebetween, the platen 46 is provided in a region facing the print portion 40 with the endless belt 23 interposed therebetween, and the belt support portion 91 is provided between the contact portion 69 and the platen 46. Since the contact portion 69, the belt support portion 91, and the platen 46 support the endless belt 23, the endless belt 23 is prevented from being vibrated in conjunction with the movement of the endless belt 23.

The belt drive roller 25 is a drive section to transport the fabric 95 in the transport direction by rotating the endless belt 23 and has a motor (not shown) to rotationally drive the belt drive roller 25. The belt drive roller 25 is provided downstream than the print portion 40 in the transport direction of the fabric 95, and the belt rotation roller 24 is provided upstream than the print portion 40. When the belt drive roller 25 is rotatably driven, the endless belt 23 is rotated in conjunction with the rotation of the belt drive roller 25, and by the rotation of the endless belt 23, the belt rotation roller 24 is rotated. By the rotation of the endless belt 23, the fabric 95 supported by the endless belt 23 is transported in the transport direction (+X axis direction), and in the print portion 40 which will be described later, an image is formed at the fabric 95.

In the example shown in FIG. 1, the fabric 95 is supported at a side (+Z axis side) at which the surface 23a of the endless belt 23 faces the print portion 40 and the fabric 95 is transported together with the endless belt 23 from a belt rotation roller 24 side to a belt drive roller 25 side. In addition, at a side (−Z axis side) at which the surface 23a of the endless belt 23 faces the washing unit 50, the endless belt 23 is only moved from the belt drive roller 25 side to the belt rotation roller 24 side.

The transport roller 26 peels away the fabric 95 on which an image is formed from the adhesive 29 provided on the endless belt 23. The transport rollers 26 and 28 relay the fabric 95 from the endless belt 23 to the medium recovery portion 30.

The medium recovery portion 30 recovers the fabric 95 transported from the medium transport portion 20. The medium recovery portion 30 includes a winding shaft portion 31 and a bearing portion 32. The winding shaft portion 31 is formed to have a cylindrical or a columnar shape and is provided to be rotatable in a circumferential direction. The strip-shaped fabric 95 is wound around the winding shaft portion 31 in a roll shape. The winding shaft portion 31 is detachably attached to the bearing portion 32. Accordingly, the fabric 95 wound around the winding shaft portion 31 is removed together with the winding shaft portion 31.

The bearing portion 32 rotatably supports both ends of the winding shaft portion 31 in the shaft direction. The medium recovery portion 30 includes a rotation drive portion (not shown) which rotatably drives the winding shaft portion 31. The rotation drive portion rotates the winding shaft portion

31 in a direction in which the fabric 95 is wound. The operation of the rotation drive portion is controlled by the control portion 1.

Next, the heating portion, the print portion 40, the heating unit 27, and the washing unit 50, which are provided along the medium transport portion 20, will be described.

1.8.3. Heating Portion

It is preferable that a heater which heats the endless belt 23 is provided in at least one of the contact portion 69 and the belt support portion 91. The heater forms the heating portion. When the heater is provided in the contact portion 69, since a pressing force and heat can be applied to the endless belt 23 by the press portion 61, the adhesion of the fabric 95 to the endless belt 23 can be preferably improved. Accordingly, when being provided in the contact portion 69 or the belt support portion 91, the heater is more preferably provided at the contact portion 69.

The heating portion softens the adhesive layer by heating the adhesive layer to exhibit adhesiveness and improves the adhesion between the fabric 95 and the adhesive layer. Accordingly, the fabric 95 is prevented from being moved on the endless belt 23, and thus, favorable transport accuracy can be obtained.

When the heater is provided in at least one of the contact portion 69 and the belt support portion 91 and the endless belt 23 is heated, the temperature of the surface 23a of the endless belt 23 is preferably 80° C. or lower, more preferably 70° C. or lower, and even more preferably 60° C. or lower. When the temperature of the surface 23a of the endless belt 23 is within the above range, the reactivity of the resin particles contained in the ink composition is suppressed, and the washing of the belt can be more easily performed in some cases. The lower limit of the temperature of the surface 23a of the endless belt 23 is not particularly limited as long as the adhesiveness of the adhesive layer is obtained, and the lower limit is preferably 30° C. or higher, more preferably 35° C. or higher, and even more preferably 40° C. or higher. The temperature of the surface 23a of the endless belt 23 can be measured, for example, by a radiation type thermometer, a contact type thermometer, or the like, and the temperature described above is more preferably measured by a radiation type thermometer.

When the heater is provided in at least one of the contact portion 69 and the belt support portion 91, a temperature detection portion (not shown) which detects the surface temperature of the endless belt 23 may be provided. As the temperature detection portion, for example, a thermocouple or the like can be used. Accordingly, since the heater is controlled by the control portion 1 based on the temperature detected by the temperature detection portion, the endless belt 23 can have a predetermined temperature. In addition, the temperature detection portion may use a non-contact type thermometer using infrared rays.

1.8.4. Print Portion

The print portion 40 is arranged at an upper side (+Z axis side) with respect to the arrangement position of the endless belt 23 and performs printing on the fabric 95 placed on the surface 23a of the endless belt 23. The print portion 40 includes an ink jet head 42, a carriage 43 on which the ink jet head 42 is mounted, and a carriage moving portion 45 which moves the carriage 43 in the width direction (Y axis direction) of the fabric 95 intersecting the transport direction.

The ink jet head 42 is a unit that sprays the ink composition and the treatment liquid supplied from a liquid cartridge (not shown) from a plurality of nozzles to the fabric 95 under control by the control portion 1 to attach the ink composition and the treatment liquid to the fabric 95. The ink jet head 42 includes the plurality of nozzles that eject the ink composition and the treatment liquid to attach the ink composition or the treatment liquid to the fabric 95 on the surface facing the fabric 95 to which the ink composition and the treatment liquid is attached. The plurality of nozzles are arrayed in a row to form a nozzle row, and the nozzle row is individually arranged corresponding to the ink composition and the treatment liquid. The ink composition and the treatment liquid are supplied from each liquid cartridge to the ink jet head 42 and are ejected in the form of liquid droplets from the nozzles by an actuator (not shown) provided in the ink jet head 42. The liquid droplets of the ink composition and the treatment liquid thus ejected are landed on the fabric 95 and are attached to the fabric 95, so that an image, a text, a pattern, a color, and the like are formed by the ink in a textile printing region of the fabric 95.

Here, in the ink jet head 42, although a piezoelectric element is used as the actuator which is a drive unit, the drive unit is not limited thereto. For example, an electromechanical conversion element to displace a vibration plate functioning as an actuator by electrostatic adsorption or an electrothermal conversion element to eject an ink composition in the form of liquid droplets by air bubbles generated by heating may be used.

The carriage moving portion 45 is provided on the upper side (+Z axis side) of the endless belt 23. The carriage moving portion 45 has a pair of guide rails 45a and 45b extending along the Y axis direction. The ink jet head 42 is supported by the guide rails 45a and 45b so as to be reciprocally movable along the Y axis direction together with the carriage 43.

The carriage moving portion 45 includes a moving mechanism (not shown) and a power source. As the moving mechanism, for example, a mechanism in which a ball screw and a ball nut are combined, a linear guide mechanism, or the like can be used. The carriage moving portion 45 includes a motor (not shown) as a power source for moving the carriage 43 along the guide rails 45a and 45b. As the motor, various motors such as a stepping motor, a servo motor, and a linear motor can be used. When the motor is driven by the control of the control portion 1, the ink jet head 42 moves in the Y axis direction together with the carriage 43.

1.8.5. Heating Unit

The heating unit 27 may be provided between the transport roller 26 and the transport roller 28. The heating unit 27 heats the ink composition or the treatment liquid ejected onto the fabric 95. Accordingly, there is a tendency that the reaction of the resin particles contained in the ink composition can sufficiently proceed. Since the resin particles sufficiently react, an image having favorable rubbing fastness may be formed in some cases. The heating unit 27 may be used in order to dry drying the fabric 95. In the heating unit 27, for example, an IR heater is contained, and by driving the IR heater, the ink composition and the treatment liquid ejected on the fabric 95 can be made to react to each other in a short period. As a result, the strip-shaped fabric 95 on which an image or the like is formed can be wound around the winding shaft portion 31.

1.8.6. Washing Unit

The washing unit 50 is arranged between the belt rotation roller 24 and the belt drive roller 25 in the X axis direction. The washing unit 50 includes a washing portion 51, a press portion 52, and a movement portion 53. The movement portion 53 integrally moves the washing unit 50 along a floor surface 99 and then fixes the washing unit 50 at a predetermined position.

The press portion 52 is an elevating device formed, for example, of an air cylinder 56 and a ball bush 57 and enables the washing portion 51 provided on the upper side to come into contact with the surface 23a of the endless belt 23. The washing portion 51 is set between the belt rotation roller 24 and the belt drive roller 25 in a state in which a predetermined tension is applied, and washes the surface (support surface) 23a of the endless belt 23 moving from the belt drive roller 25 toward the belt rotation roller 24 from a bottom side (−Z axis direction).

The washing portion 51 includes a washing bath 54, a washing roller 58, and a blade 55. The washing bath 54 is a tank that stores a washing liquid used for washing ink and foreign matter attached to the surface 23a of the endless belt 23, and the washing roller 58 and the blade 55 are provided inside the washing bath 54. As the washing liquid, for example, water or a water-soluble solvent (such as an aqueous alcohol solution) may be used, and as necessary, a surfactant and a defoaming agent may also be added.

When the washing roller 58 is rotated, the washing liquid is supplied to the surface 23a of the endless belt 23, and at the same time, the washing roller 58 and the endless belt 23 are rubbed with each other. Accordingly, the ink composition, the fibers of the fabric 95, and the like attached to the endless belt 23 are removed by the washing roller 58.

The blade 55 may be formed of, for example, a flexible material such as a silicon rubber. The blade 55 is provided downstream than the washing roller 58 in the transport direction of the endless belt 23. Since the endless belt 23 and the blade 55 are rubbed with each other, the washing liquid remaining on the surface 23a of the endless belt 23 is removed.

FIG. 2 is an example which shows a configuration of an ink jet head. The colored ink attachment step is performed by the entire ink jet head C for the colored ink composition. Further, the treatment liquid attachment step is performed by the same main scanning as the colored ink attachment step by the entire ink jet head R for the treatment liquid. Further, the non-colored ink attachment step is performed by the entire ink jet head W for the non-colored ink composition. Further, the treatment liquid attachment step is performed by the same main scanning as the non-colored ink attachment step by the entire ink jet head R for the treatment liquid. The sub-scanning may not be performed between the colored ink attachment step and the non-colored ink attachment step, and the sub-scanning may be performed for image position alignment. The sub-scanning may be performed after the non-colored ink attachment step. In FIG. 2, SS represents a sub-scanning direction.

Accordingly, the colored ink composition, the treatment liquid, and the non-colored ink composition can be attached to the same scanning region of the fabric by the same main scanning. The scanning region means a region scanned by the ejecting nozzle rows, and the colored ink composition, the treatment liquid, and the non-colored ink composition can be attached to the same region by the same main scanning.

The operation of attaching the colored ink composition, the treatment liquid, and the non-colored ink composition to the same scanning region of the fabric by the same main scanning may be performed in a part of a region in which an image is to be formed, or in the entire region in which an image is to be formed. However, the operation is preferable performed in the entire region in which an image is to be formed.

2. EXAMPLES AND COMPARATIVE EXAMPLES

Hereinafter, the present disclosure will be specifically described with reference to Examples, and the present disclosure is not limited to these Examples. Hereinafter, "part" and "%" are based on mass unless otherwise specified. Unless otherwise specified, the evaluation was performed in an environment of a temperature of 25.0° C. and a relative humidity of 40.0%.

2.1. Preparation of Treatment Liquid

Each component was put in a container so as to have the composition shown in Table 1 (FIG. 3), components were mixed and stirred with a magnetic stirrer for 2 hour, and then the mixture was filtered using a PTFE membrane filter having a pore diameter of 5 μm to obtain a treatment liquid to be used in each Example and each Comparative Example. The numerical values in the table represent the solid content.

2.2. Preparation of Colored Ink Composition

Each component was put in a container so as to have the composition shown in Table 2 (FIG. 4), the components mixed and stirred with a magnetic stirrer for 2 hours, and then the mixture was filtered using a membrane filter having a pore diameter of 5 μm to obtain a colored ink composition to be used in each Example and each Comparative Example. The numerical values in the table represent the solid content.

2.3. Preparation of Non-Colored Ink Composition

Each component was put in a container so as to have the composition shown in Table 3 (FIG. 5), the components were mixed and stirred with a magnetic stirrer for 2 hours, and then the mixture was filtered using a PTFE membrane filter having a pore diameter of 5 μm to obtain a treatment liquid to be used in each Example and each Comparative Example. The numerical values in the table represent the solid content.

The abbreviations and trade names shown in Tables 1 to 3 (FIGS. 3 to 5) are supplemented.

Surfactant (E1010): OLFINE E1010, manufactured by Nissin Chemical Industry Co., Ltd., acetylene glycol-based surfactant)

PROXEL XL2: manufactured by LONZA KK., preservative, fungicide)

UW-1527F: ETERNACOLL UW series, manufactured by UBE Corporation, Ltd, urethane resin Mowinyl 6760: manufactured by Japan Coating Resin Corporation, acrylic resin PB15:3: Cyan pigment C. I. Pigment Blue 15:3

TEG: Triethylene glycol

BTGH: Triethylene glycol monobutyl ether

TEA: Triethanolamine 2.4. Evaluation Method 2.4.1. Preparation of Textile Printed Matter An apparatus modified from PX-H8000 (manufactured by Seiko Epson Corporation) to have a nozzle array in FIG. 2 was used. A 100% cotton white broad was used as a recording medium. As a head, a head unit (a distance between nozzles in the width direction of the recording medium was 600 dpi, the number of nozzles was 600) was used. The recording conditions were as shown in the table. In addition, except for Comparative Example 1, the treatment liquid, the colored ink composition, and the non-colored ink composition were attached to the same region of the fabric in one main scanning.

A textile printed matter in which a solid pattern image was formed at an A4-size fabric (ink was textile printed) was produced. In addition, the "solid pattern image" means an image in which dots are recorded on all pixels each indicating a minimum recording unit region defined by the recording resolution (Duty 100%). Then, the textile printed matter was heat-treated in an oven at 160° C. for 3 minutes and dried.

2.4.2. Evaluation of Strike-Through

With respect to the printed fabric, an OD value of cyan on the rear surface of the printed matter was measured using a fluorescence spectrophotometer ("FD-7", manufactured by Konica Minolta, Inc.), and the degree of strike-through was evaluated according to the following criteria. When the evaluation result is A or B, it can be said that the strike-through is suppressed and the contamination of the transport system can be prevented. The results are shown in Tables 4 to 6 (FIGS. 6 to 8).

A: OD value of less than 0.6

B: OD value of 0.6 or more and less than 0.7

C: OD value of 0.7 or more 2.4.3. Evaluation of Color Developing Properties

An OD value of cyan on the printed fabric was measured using a fluorescence spectrophotometer ("FD-7", manufactured by Konica Minolta, Inc.) and the color developing properties were evaluated according to the following criteria. When the evaluation result is A or B, it can be said that favorable color developing properties are obtained. The results are shown in Tables 4 to 6 (FIGS. 6 to 8).

A: OD value of 1.42 or more

B: OD value of 1.40 or more and less than 1.42

C: OD value of less than 1.40

2.4.4. Evaluation of Rubbing Fastness

The rubbing fastness of the printed fabric was tested by a test method in accordance with ISO105-X12, and the wet rubbing fastness was evaluated according to the following criteria. When the evaluation result is A or B, it can be said that favorable fastness is obtained. The results are shown in Tables 4 to 6 (FIGS. 6 to 8).

A: Grade 3 or higher

B: Grade 2 or 3

C: lower than Grade 2

2.4.5. Evaluation of Intermittence

After idle driving for 3 minutes using an apparatus modified from PX-H8000 (manufactured by Seiko Epson Corporation) to have a nozzle array in FIG. 2, the number of missing nozzles was counted using a nozzle check pattern for the clear ink. Evaluation was performed according to the following criteria. The results are shown in Tables 4 to 6 (FIGS. 6 to 8). In all cases, the intermittent stability was high enough to withstand actual use.

A: The number of non-ejection nozzles was within 5.

B: The number of non-ejection nozzles was 6 or more and within 10.

C: The number of non-ejection nozzles was 11 or more and within 15.

2.4.6. Calculation of Attachment Amount

The attachment amount of the liquid droplet per unit area was calculated by the following equation. The values for each example are shown in Tables 4 to 6 (FIGS. 6 to 8).

$$\text{Resolution} \times \text{duty} \times \text{ejection amount}$$

For example, when resolution: 1200×600 dpi
duty: 100%, and
ejection amount: 24 ng/dot, $$1200 \times 600 \times 1 \times 24 \times 10^{-6} = 17.28 \left( \text{mg/inch}^2 \right)$$

2.5. Evaluation Results

In Tables 4 to 6 (FIGS. 6 to 8), in each Example in which the colored ink composition containing the pigment and the anionic first resin particles, and the treatment liquid containing the polyvalent metal salt, and the non-colored ink composition containing the anionic second resin particles were attached to the same scanning region of the fabric by the same main scanning by the ink jet method, the attachment amount of the polyvalent metal salt to the fabric was 0.3 (mg/inch$^2$) or more, the content of the second resin particles with respect to the total amount of the non-colored ink composition was higher than the content of the first resin particles with respect to the total amount of the colored ink composition, and the attachment amount of the non-colored ink composition was smaller than the attachment amount of the colored ink composition, favorable results were obtained in terms of all of the strike-through, color developing properties, and rubbing fastness.

The present disclosure includes a configuration substantially the same as the configuration described in the embodiment, for example, a configuration having the same function, method, and result, or a configuration having the same purpose and effect. Further, the present disclosure includes configurations in which non-essential parts of the configuration described in the embodiments are replaced. In addition, the present disclosure includes configurations that achieve the same effects or configurations that can achieve the same objects as those of the configurations described in the embodiment. Further, the present disclosure includes configurations in which a known technology is added to the configurations described in the embodiments.

The following contents are derived from the above-described embodiment and modification example.

An ink jet textile printing recording method includes a colored ink attachment step of attaching a liquid droplet of a colored ink composition containing a pigment and an anionic first resin particle to a fabric, a treatment liquid attachment step of attaching a liquid droplet of a treatment liquid containing a polyvalent metal salt to the fabric, and a non-colored ink attachment step of attaching a liquid droplet of a non-colored ink composition containing an anionic second resin particle to the fabric, in which the colored ink attachment step, the treatment liquid attachment step, and the non-colored ink attachment step are performed by an ink jet method, in the ink jet method, main scanning is performed for recording by moving an ink jet head in a direction perpendicular to a transport direction of the fabric, the colored ink composition, the treatment liquid, and the non-colored ink composition are attached to the same scanning region of the fabric by the same main scanning, an attachment amount of the polyvalent metal salt to the fabric is 0.3 (mg/inch$^2$) or more, a content of the second resin particle with respect to a total amount of the non-colored ink composition is higher than a content of the first resin particle with respect to a total amount of the colored ink composition, and an attachment amount of the non-colored ink composition is smaller than an attachment amount of the colored ink composition.

According to the ink jet textile printing recording method, the color developing properties can be improved by aggregation of the components of the colored ink composition and strike-through can be suppressed by aggregation of the components of the non-colored ink composition. That is, when the treatment liquid, the colored ink composition, and the non-colored ink composition are attached to the same region of the fabric, the amount of moisture is increased and strike-through easily occurs. Accordingly, when the content of the second resin particle in the non-colored ink composition is higher than the content of the first resin particle in the colored ink composition, the attachment amount of the non-colored ink composition is smaller than the attachment amount of the colored ink composition, and the attachment amount of the polyvalent metal salt to the fabric is 0.3 (mg/inch$^2$) or more, the viscosity of the treatment liquid, the colored ink composition, and the non-colored ink composition attached to the fabric is increased by the aggregation of the second resin particles, and thus the strike-through of the image can be suppressed. In addition, with this, the rubbing fastness of the image can be improved.

In the ink jet textile printing recording method,
the attachment amount of the colored ink composition may be 10 (mg/inch$^2$) or more.

According to this ink jet textile printing recording method, even in a region in which the attachment amount of the colored ink composition is relatively large, and even in a region in which strike-through more easily occurs, the strike-through can be suppressed, and the rubbing fastness of the image can be improved.

In the ink jet textile printing recording method,
a total attachment amount of the treatment liquid, the colored ink composition, and the non-colored ink composition may be 70 (mg/inch$^2$) or less.

According to the ink jet textile printing recording method, it is easier to suppress the strike-through.

In the ink jet textile printing recording method,
a total attachment amount of the treatment liquid, the colored ink composition, and the non-colored ink composition may be 30 (mg/inch$^2$) or more.

According to the ink jet textile printing recording method, the strike-through can be suppressed, and the rubbing fastness of the image can be improved.

In the ink jet textile printing recording method,
an attachment amount of the treatment liquid may be 6 (mg/inch$^2$) or more and 18 (mg/inch$^2$) or less, the attachment amount of the colored ink composition may be 13 (mg/inch$^2$) or more and 40 (mg/inch$^2$) or less, and the attachment amount of the non-colored ink composition may be 10 (mg/inch$^2$) or more and 18 (mg/inch$^2$) or less.

According to the ink jet textile printing recording method, the strike-through can be further suppressed, and the rubbing fastness of the image can be improved.

In the ink jet textile printing recording method,
a total attachment amount of the treatment liquid, the colored ink composition, and the non-colored ink composition may be 45 (mg/inch$^2$) or less in one main scanning.

According to the ink jet textile printing recording method, the strike-through can be further suppressed, and the rubbing fastness of the image can be improved.

In the ink jet textile printing recording method,
the attachment amount of the non-colored ink composition may be 0.9 or less in mass ratio with respect to the attachment amount of the colored ink composition.

According to the ink jet textile printing recording method, the strike-through can be further suppressed, and the rubbing fastness of the image can be improved.

In the ink jet textile printing recording method,
the attachment amount of the polyvalent metal salt may be 1.5 (mg/inch$^2$) or less.

According to the ink jet textile printing recording method, the color developing properties of the image can be further improved.

In the ink jet textile printing recording method,
$0.5 \geq A/(B+C) \ldots$ (I), where an attachment amount of the pigment in the colored ink composition is denoted as A (mg/inch$^2$), an attachment amount of the first resin particle is denoted as B (mg/inch$^2$), and an attachment amount of the second resin particle in the non-colored ink composition is denoted as C (mg/inch$^2$).

According to the ink jet textile printing recording method, an image with more favorable rubbing fastness can be obtained.

In the ink jet textile printing recording method,
$0.1 \leq D/(A+B+C) \ldots$ (II), where an attachment amount of the pigment in the colored ink composition is denoted as A (mg/inch$^2$), an attachment amount of the first resin particle is denoted as B (mg/inch$^2$), an attachment amount of the second resin particle in the non-colored ink composition is denoted as C (mg/inch$^2$), and an attachment amount of the polyvalent metal salt in the treatment liquid is denoted as D (mg/inch$^2$).

According to the ink jet textile printing recording method, the strike-through can be further suppressed, and an image having more favorable rubbing fastness can be obtained.

In ink jet textile printing recording method,
the non-colored ink composition may contain a polyhydric alcohol having a normal boiling point of 250° C. or higher.

According to the ink jet textile printing recording method, even when strike-through more easily occurs, the strike-through can be suppressed.

In ink jet textile printing recording method,
the polyvalent metal salt may be magnesium sulfate.

According to the ink jet textile printing recording method, an image having more favorable color developing properties can be formed.

In ink jet textile printing recording method,
the first resin particle and the second resin particle may be a urethane resin.

According to the ink jet textile printing recording method, an image having more favorable rubbing fastness can be formed.

In ink jet textile printing recording method,
a content of the polyvalent metal salt in the treatment liquid may be 1.0% by mass or more and 9.0% by mass or less.

According to the ink jet textile printing recording method, an image having more favorable color developing properties can be formed.

In ink jet textile printing recording method,
the content of the first resin particle in the colored ink composition may be 3.0% by mass or more and 7.0% by mass or less.

In ink jet textile printing recording method,
the content of the second resin particle in the non-colored ink composition may be 8% by mass or more and 20% by mass or less.

According to the ink jet textile printing recording method, an image having more favorable rubbing fastness can be formed.

What is claimed is:

1. An ink jet textile printing recording method comprising:
   a colored ink attachment step of attaching a liquid droplet of a colored ink composition containing a pigment and an anionic first resin particle to a fabric;
   a treatment liquid attachment step of attaching a liquid droplet of a treatment liquid containing a polyvalent metal salt to the fabric; and
   a non-colored ink attachment step of attaching a liquid droplet of a non-colored ink composition containing an anionic second resin particle to the fabric, wherein
   the colored ink attachment step, the treatment liquid attachment step, and the non-colored ink attachment step are performed by an ink jet method,
   in the ink jet method, main scanning is performed for recording by moving an ink jet head in a direction perpendicular to a transport direction of the fabric,
   the colored ink composition, the treatment liquid, and the non-colored ink composition are attached to the same scanning region of the fabric by the same main scanning,
   an attachment amount of the polyvalent metal salt to the fabric is 0.3 (mg/inch$^2$) or more,
   a content of the first resin particle in the colored ink composition is 0.1% by mass or more and 4.0% by mass or less with respect to a total amount of the colored in composition,
   a content of the second resin particle with respect to a total amount of the non-colored ink composition is higher than a content of the first resin particle with respect to the total amount of the colored ink composition, and
   an attachment amount of the non-colored ink composition is smaller than an attachment amount of the colored ink composition.

2. The ink jet textile printing recording method according to claim 1, wherein
   the attachment amount of the colored ink composition is 10 (mg/inch$^2$) or more.

3. The ink jet textile printing recording method according to claim 1, wherein
   a total attachment amount of the treatment liquid, the colored ink composition, and the non-colored ink composition is 70 (mg/inch$^2$) or less.

4. The ink jet textile printing recording method according to claim 1, wherein
   a total attachment amount of the treatment liquid, the colored ink composition, and the non-colored ink composition is 30 (mg/inch$^2$) or more.

5. The ink jet textile printing recording method according to claim 1, wherein
   an attachment amount of the treatment liquid is 6 (mg/inch$^2$) or more and 18 (mg/inch$^2$) or less, the attachment amount of the colored ink composition is 13 (mg/inch$^2$) or more and 40 (mg/inch$^2$) or less, and the attachment amount of the non-colored ink composition is 10 (mg/inch$^2$) or more and 18 (mg/inch$^2$) or less.

6. The ink jet textile printing recording method according to claim 1, wherein
   a total attachment amount of the treatment liquid, the colored ink composition, and the non-colored ink composition is 45 (mg/inch$^2$) or less in one main scanning.

7. The ink jet textile printing recording method according to claim 1, wherein
   the attachment amount of the non-colored ink composition is 0.9 or less in mass ratio with respect to the attachment amount of the colored ink composition.

8. The ink jet textile printing recording method according to claim 1, wherein
   the attachment amount of the polyvalent metal salt is 1.5 (mg/inch$^2$) or less.

9. The ink jet textile printing recording method according to claim 1, wherein
   $0.5 \geq A/(B+C) \ldots$ (I), where an attachment amount of the pigment in the colored ink composition is denoted as A (mg/inch$^2$), an attachment amount of the first resin particle is denoted as B (mg/inch$^2$), and an attachment amount of the second resin particle in the non-colored ink composition is denoted as C (mg/inch$^2$).

10. The ink jet textile printing recording method according to claim 1, wherein
   $0.1 \leq D/(A+B+C) \ldots$ (II), where an attachment amount of the pigment in the colored ink composition is denoted as A (mg/inch$^2$), an attachment amount of the first resin particle is denoted as B (mg/inch$^2$), an attachment amount of the second resin particle in the non-colored ink composition is denoted as C (mg/inch$^2$), and an attachment amount of the polyvalent metal salt in the treatment liquid is denoted as D (mg/inch$^2$).

11. The ink jet textile printing recording method according to claim 1, wherein
   the non-colored ink composition contains a polyhydric alcohol having a normal boiling point of 250° C. or higher.

12. The ink jet textile printing recording method according to claim 1, wherein
   the polyvalent metal salt is magnesium sulfate.

13. The ink jet textile printing recording method according to claim 1, wherein
   the first resin particle and the second resin particle are a urethane resin.

14. The ink jet textile printing recording method according to claim 1, wherein
   a content of the polyvalent metal salt in the treatment liquid is 1.0% by mass or more and 9.0% by mass or less.

15. The ink jet textile printing recording method according to claim 1, wherein
   the content of the second resin particle in the non-colored ink composition is 8% by mass or more and 20% by mass or less.

* * * * *